(12) United States Patent
Mishina et al.

(10) Patent No.: US 8,832,925 B2
(45) Date of Patent: Sep. 16, 2014

(54) STATOR MANUFACTURING METHOD

(75) Inventors: Tokuhisa Mishina, Anjo (JP); Shingo Hashimoto, Anjo (JP); Masaki Saito, Anjo (JP); Kazuya Iwatsuki, Anjo (JP)

(73) Assignee: Aisin Aw Co., Ltd., Aichi-Ken (JP)

( * ) Notice: Subject to any disclaimer, the term of this patent is extended or adjusted under 35 U.S.C. 154(b) by 1027 days.

(21) Appl. No.: 12/890,028

(22) Filed: Sep. 24, 2010

(65) Prior Publication Data

US 2011/0099797 A1 May 5, 2011

(30) Foreign Application Priority Data

Oct. 30, 2009 (JP) ................................. 2009-251339

(51) Int. Cl.
*H02K 15/06* (2006.01)
*H02K 15/04* (2006.01)

(52) U.S. Cl.
CPC .......... *H02K 15/067* (2013.01); *H02K 15/0435* (2013.01)
USPC ............................................. 29/596; 29/732

(58) Field of Classification Search
CPC . H02K 15/063; H02K 15/067; H02K 15/065; H02K 15/068; H02K 15/085
USPC .......................................... 29/596, 606, 732
See application file for complete search history.

(56) References Cited

U.S. PATENT DOCUMENTS

| | | | |
|---|---|---|---|
| 4,351,103 A | 9/1982 | Rodenbeck | |
| 6,346,758 B1 | 2/2002 | Nakamura | |
| 6,400,056 B1 | 6/2002 | Naka et al. | |
| 7,243,414 B2 | 7/2007 | Even | |
| 2004/0207283 A1* | 10/2004 | Oohashi et al. | 310/207 |
| 2009/0260218 A1* | 10/2009 | Akimoto et al. | 29/596 |

FOREIGN PATENT DOCUMENTS

| | | |
|---|---|---|
| JP | 57-52354 A | 3/1982 |
| JP | 05-122910 A | 5/1993 |
| JP | 07-222411 A | 8/1995 |
| JP | 2000-278902 A | 10/2000 |
| JP | 2000-308314 A | 11/2000 |
| JP | 2001-28849 A | 1/2001 |
| JP | 2003-153478 A | 5/2003 |
| JP | 2005-057950 A | 3/2005 |

(Continued)

OTHER PUBLICATIONS

International Search Report for corresponding International Patent Application No. PCT/JP2010/005829 mailed Dec. 14, 2010.

(Continued)

*Primary Examiner* — Livius R Cazan
(74) *Attorney, Agent, or Firm* — Sughrue Mion, PLLC

(57) ABSTRACT

An apparatus and a method for manufacturing a stator is disclosed. The stator includes a stator core having slots formed along an axial direction at a plurality of locations in a circumferential direction, and a coil formed by combining a plurality of rectangular wires that have a plurality of straight portions being disposed in the slots and arranged side by side in the circumferential direction and in a radial direction. A restriction jig having a number of restriction pieces is disposed on a first-end side of the coil in the axial direction. The coil is inserted into the stator core from the first-end side in the axial direction to dispose the straight portions in the slots. Circumferential positions of the straight portions are restricted along the axial direction through contact with the restriction pieces by relatively moving the restriction jig and the coil in the axial direction.

6 Claims, 20 Drawing Sheets

(56) References Cited

FOREIGN PATENT DOCUMENTS

| | | |
|---|---|---|
| JP | 2005-110360 A | 4/2005 |
| JP | 2005-531273 A | 10/2005 |
| JP | 2009-268158 A | 11/2009 |

OTHER PUBLICATIONS

Partial Translation of Japanese Office Action for corresponding JP Patent Application No. 2009-251339 issued on Jul. 30, 2013.

* cited by examiner

F I G . 2
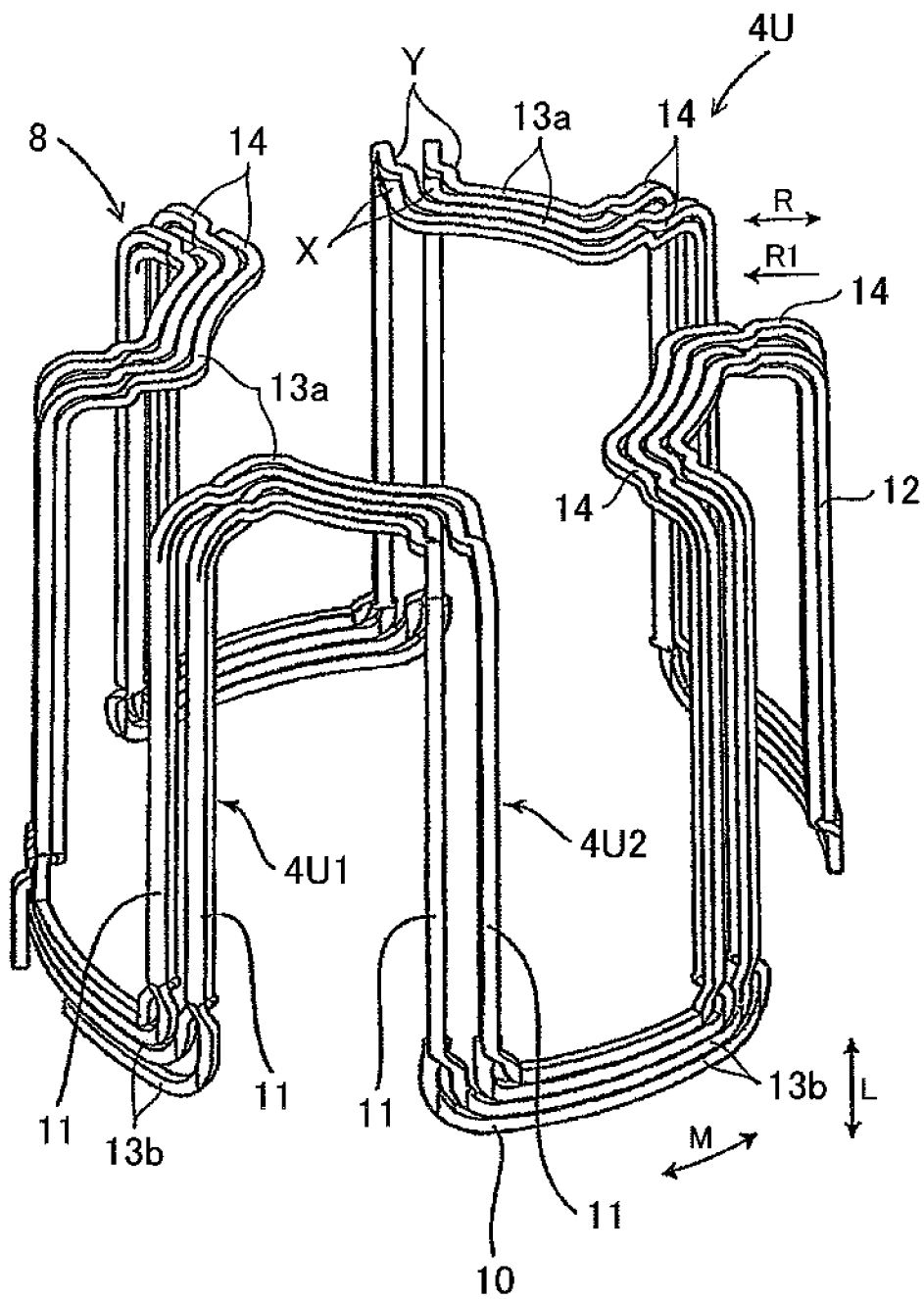

F I G . 11
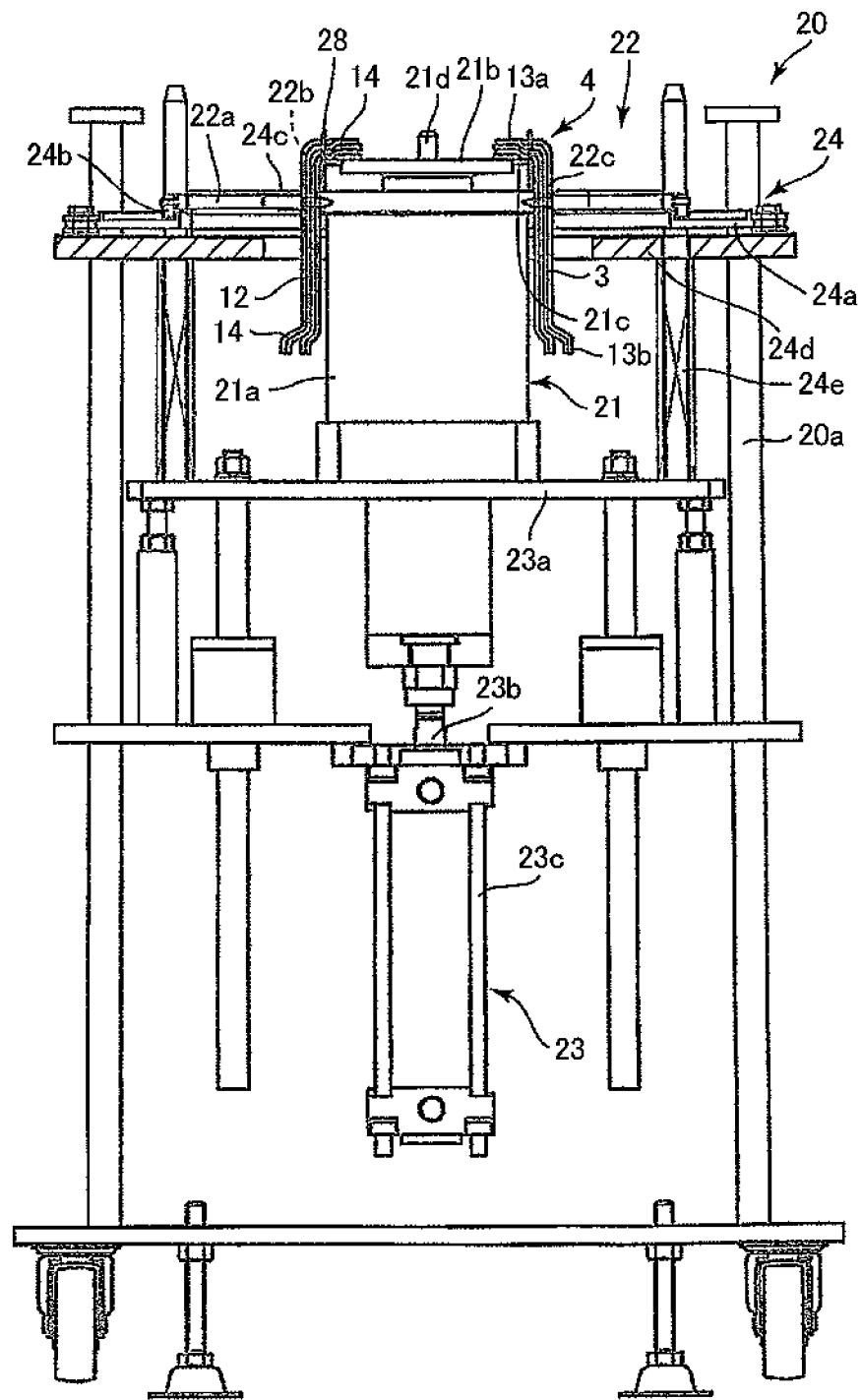

STATOR MANUFACTURING METHOD

INCORPORATION BY REFERENCE

The disclosure of Japanese Patent Application No. 2009-251339 filed on Oct. 30, 2009 including the specification, drawings and abstract is incorporated herein by reference in its entirety.

BACKGROUND OF THE INVENTION

The present invention relates to a manufacturing method and a manufacturing apparatus for a stator for a rotary electric machine, for example, and more particularly to a manufacturing method and a manufacturing apparatus for a stator in which a coil formed by combining a plurality of rectangular wires with a rectangular cross section is disposed in a stator core by distributed winding.

DESCRIPTION OF THE RELATED ART

In general, rotary electric machines such as induction motors and direct-current motors (including generators) are widely used as power sources for industries or vehicles. Stator coils of the rotary electric machines are often formed by distributed winding which produces high specific power. It has recently been proposed to use a rectangular wire, which yields a high space factor, as a magnet wire in motors for use in hybrid vehicles and electric vehicles in view of output/dimensional requirements.

In the case where a coil is disposed in a stator core to form a stator, a part of the coil is disposed in slots formed in the stator core at a plurality of locations in the circumferential direction to extend in the radial direction. There is known a structure, employed in the case where a coil is formed by concentrated winding, in which the coil is shaped in advance to conform to the shape of slots in which the coil is to be disposed, the shaped coil is inserted into a stator core from an axial direction, and thereafter an end portion of the coil is folded into a predetermined shape (see Japanese Patent Application Publication No. JP-A-2003-153478).

There is also conventionally known a structure in which an insulating sheet is disposed between slots of a stator core and a coil to improve insulation between the slots and the coil (see Japanese Patent Application Publication No. JP-A-2000-308314 and Japanese Patent Application Publication No. JP-A-2001-28849)

SUMMARY OF THE INVENTION

The invention disclosed in Japanese Patent Application Publication No. JP-A-2003-153478 described above is a method for disposing a coil wound by concentrated winding in a stator core, and is difficult to apply to a coil wound by distributed winding. That is, a coil wound by distributed winding is formed by a metal wire including a plurality of straight portions and a plurality of continuous portions that alternately connect first-end portions and second-end portions of adjacent ones of the straight portions with each other, and the plurality of straight portions are disposed in respective slots to form a stator. On the other hand, a coil wound by concentrated winding is formed by disposing only two straight portions in respective slots, and is significantly different in configuration from the coil wound by distributed winding, in which straight portions are disposed in a plurality of slots. Thus, because the two types of coils have different configurations, it is not easy to apply the method for disposing a coil wound by concentrated winding to a coil wound by distributed winding.

In particular, in the case where a rectangular wire with a rectangular cross section is used as a metal wire to form a coil, it is difficult to dispose the coil in a stator core compared to the case where a round wire with a circular cross section is used, because the rectangular wire has directional property for insertion into slots. That is, it is necessary to insert the rectangular wire into the slots while keeping side surfaces of the rectangular wire and inner side surfaces of the slots in parallel with each other. Therefore, in the case where a rectangular wire is to be disposed in slots by distributed winding, it is necessary to consider the directional property of the rectangular wire, which makes the work of disposing the wire difficult. In contrast, a round wire has no directional property and can be disposed in slots by freely deforming the round wire, which makes the work of disposing the wire less difficult than the case where a rectangular wire is used.

It is conceivable to manually perform the work of disposing a coil in a stator core by distributed winding. Specifically, it is conceivable to dispose a coil in a stator core by distributed winding by repeating the work of sequentially disposing straight portions in slots from a radial direction by elastically deforming continuous portions. However, such work may be time-consuming and may increase the production cost.

It is difficult to form a coil into shape by distributed winding in advance and thereafter manually dispose the straight portions in a stator core from a radial direction, because it is necessary to elastically deform the continuous portions to a greater degree. In particular, in the case where the coil is formed by a rectangular wire, the coil has a high rigidity and thus is difficult to elastically deform. In order to reduce the axial dimension of a coil, it is conceivable to employ a structure in which first-end portions of the straight portions are folded radially inward. However, it is more difficult to manually dispose a coil with such a structure in a stator core as described above, because the presence of the folded portions makes elastic deformation more difficult.

In the case where an insulating sheet is provided between slots and a coil, the coil is disposed with the insulating sheet disposed in the slots. Depending on how the coil is disposed, however, the insulating sheet may come off from the slots, or a part of the insulating sheet may be turned up and caught.

It is therefore an object of the present invention to provide a manufacturing method and a manufacturing apparatus for a stator that allow a coil formed from a rectangular wire to be easily disposed in a stator core by distributed winding.

According to the inventions of first and seventh aspects, the circumferential positions of the straight portions can be restricted along the axial direction by the restriction pieces of the restriction jig, and in this state, the coil can be inserted into the stator core from the first-end side in the axial direction. Therefore, the work of disposing the coil in the stator core by distributed winding can be performed easily, and the straight portions can be disposed in the slots accurately. In particular, even if the straight portions are inclined with respect to the slots, such inclination is corrected by the restriction jig. Therefore, the resistance of inserting the straight portions into the slots can be reduced, which allows the insertion work to be performed smoothly and accurately. Such a reduction in insertion resistance can prevent damage that may occur to the coil and an insulating sheet disposed in the slots, if any, during the insertion.

According to the inventions of second and eighth aspects, the restriction pieces are moved in the radial direction to insert the contact portion between adjacent ones of the straight portions. Therefore, along with the insertion, the straight portions disposed side by side in the radial direction and in the same phase in the circumferential direction can be positioned appropriately in the circumferential direction on the first-end side in the axial direction.

According to the inventions of third and tenth aspects, the restriction jig can restrict the straight portions at a position closer to the stator core, which allows the work of inserting the coil into the stator core to be performed more accurately.

According to the inventions of fourth and eleventh aspects, the restriction jig can also restrict the radial positions of the straight portions, which allows the work of inserting the coil into the stator core to be performed more easily and accurately.

According to the inventions of fifth and thirteenth aspects, the work of inserting the coil into the stator core is performed with a part of the opening jig disposed in the insulating sheet, which makes it unlikely that the distal end of the coil interferes with the insulating sheet during the insertion work. This prevents the insulating sheet from being pushed by the coil and coming off from the slots during the insertion, and prevents a part of the insulating sheet from being turned up and caught.

According to the inventions of sixth and fourteenth aspects, the opening jig is inserted from an opening of the slots on an end surface opposite to the side from which the coil is inserted to spread the insulating sheet in the slots. Therefore, the insulating sheet can be spread more reliably during the insertion of the coil, which makes it more unlikely that the distal end of the coil interferes with the insulating sheet.

According to the invention of a ninth aspect, the contact portions of the restriction pieces are formed in a conical shape. Therefore, the contact area between the restriction pieces and the straight portions can be reduced, which allows the restriction jig and the coil to relatively move more smoothly.

According to the invention of a twelfth aspect, the circumferential positions of the straight portions can be restricted on the first-end side when disposing the coil in the insertion jig. Therefore, the restriction pieces can be smoothly disposed between the adjacent ones of the straight portions.

According to the invention of a fifteenth aspect, the opening jig has a guide portion that guides the radially outer surfaces of the straight portions, which makes it more unlikely that the distal end of the coil interferes with the insulating sheet during the work of inserting the coil into the stator core.

BRIEF DESCRIPTION OF THE DRAWINGS

FIG. 2 is a perspective view showing a coil (for U-phase);

FIG. 11 shows a second step of the same stator manufacturing method, which is similar to FIG. 10;

DETAILED DESCRIPTION OF THE EMBODIMENTS

Figure 1:
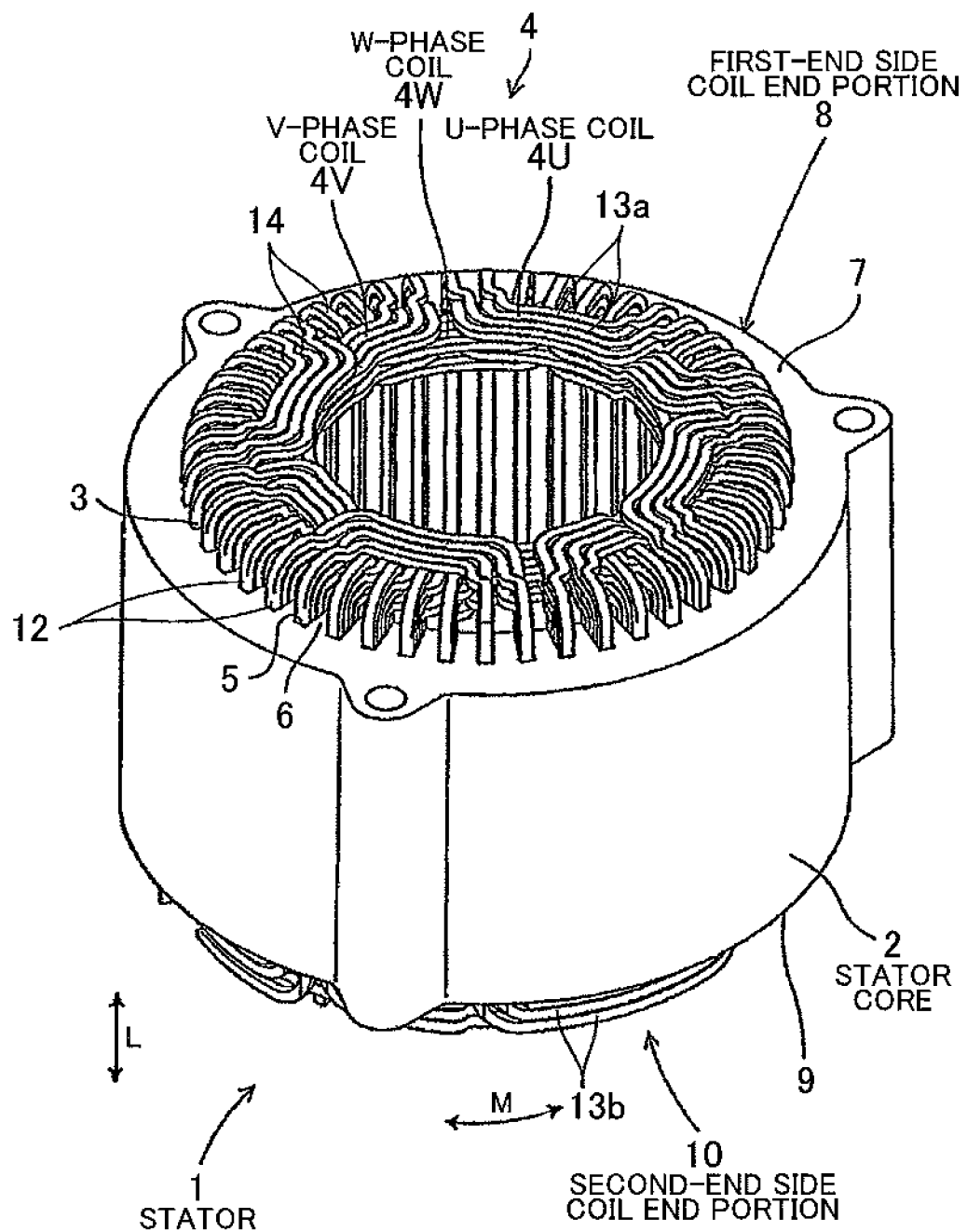
FIG. 1 is a perspective view showing a stator manufactured in accordance with the present invention.
Figure 3:
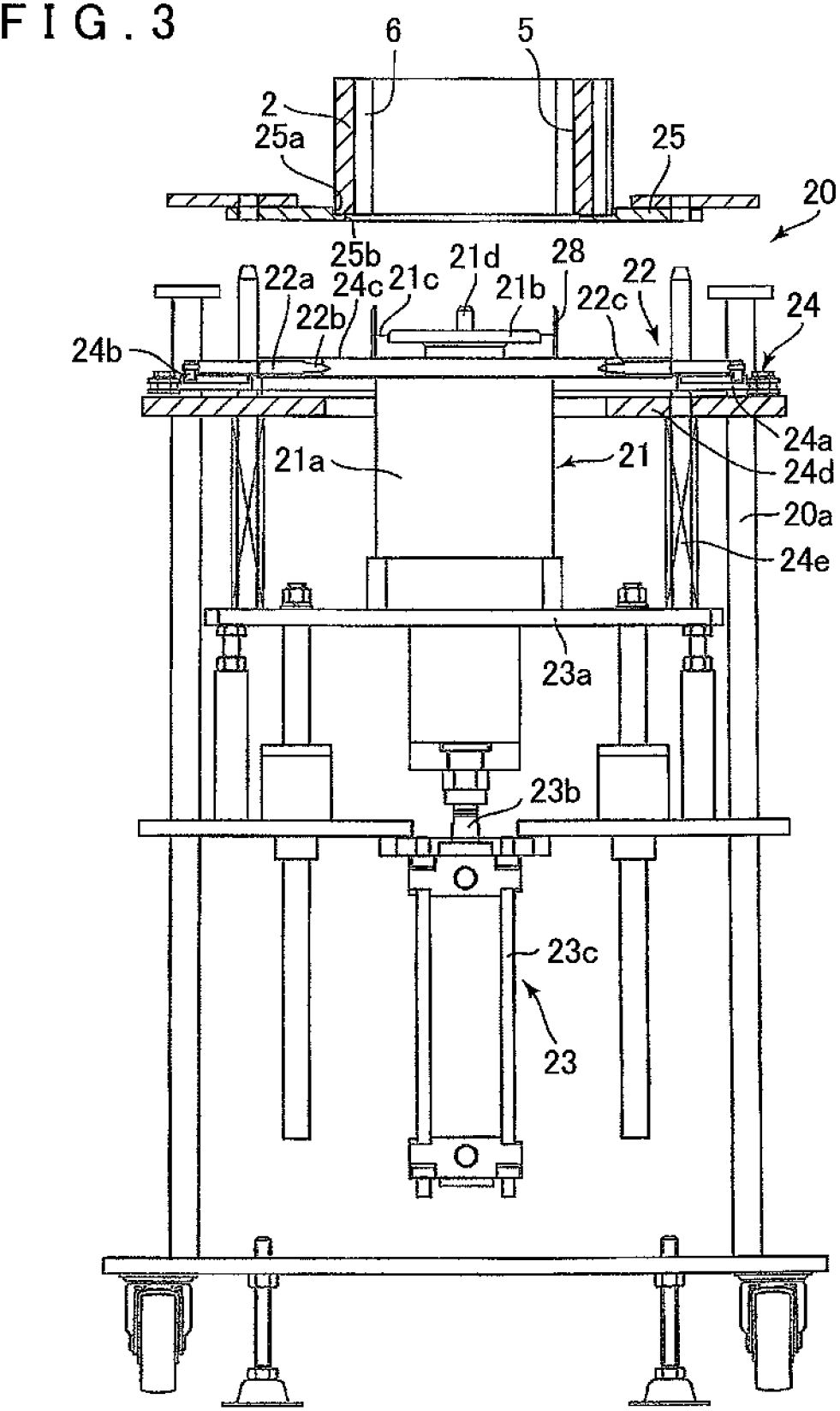
FIG. 3 shows, as partially cut away, a stator manufacturing apparatus according to an embodiment of the present invention.

An embodiment of the present invention will be described with reference to the drawings. First, an example of a stator for a rotary electric machine (such as a motor and a generator) manufactured by a manufacturing apparatus and a manufacturing method for a stator according to the present invention will be described with reference to FIGS. 1 and 2. A stator 1 forms an electric motor (including a generator) together with a rotor. Such an electric motor is suitable as an electric motor (including a generator), in particular a brushless DC motor, serving as a drive source for electric vehicles and hybrid vehicles. As shown in FIG. 1, the stator 1 includes a stator core 2 formed by laminating a large number of thin silicon steel plates, and a coil 4 formed by winding a magnet wire (conductor, winding) 3 made of a predetermined material. The stator core 2 has a ring shape, opens radially inward and at both ends in the axial direction, and includes slots 5 and teeth 6 formed alternately at a plurality of locations in the circumferential direction to extend in the axial direction. The slots 5 and the teeth 6 are formed along the radial direction. Coils 4 (4U, 4V, 4W) for three phases U, V, W are wound by distributed winding through two slots 5 separated at a predetermined pitch.

The magnet wire 3 is formed by a rectangular wire with a rectangular cross section, and includes a conductor made of copper or the like and an insulating coating made of an insulating resin or the like formed entirely around the conductor. In the coils 4U, 4V, 4W for the three phases formed by the wire 3, a plurality of (for example, four) wires 3 for the same phase are disposed side by side in the radial direction of the stator core 2 in the slots 5 for the same phase, a plurality of wires 3 for the same phase are bent inward in the radial direction of the stator core 2 and disposed side by side in the radial direction of the stator core 2 at a first-end side coil end portion 8 which projects from a first-end surface 7 (upper-end surface in FIG. 1) of the stator core 2 in an axial direction L, and a plurality of wires 3 for the same phase are disposed side by side in the radial direction (or in the axial direction) of the stator core 2 at a second-end side coil end portion 10 which projects from a second-end surface 9 (lower-end surface in FIG. 1) of the stator core 2 in the axial direction L.

The coil 4U for the U-phase is illustrated as a representative example. As shown in FIG. 2, the coil 4U is formed by two sets of coils 4U1, 4U2 occupying two adjacent slots 5, 5 such that the coils 4U1, 4U2 occupying closer ones and farther ones of the two adjacent slots 5, 5 are respectively coupled to each other at predetermined intervals alternately on the first-end side and the second-end side in the axial direction L. The sets of coils 4U1, 4U2 include slot conductor portions 11 disposed in the slots 5, the first-end side coil end portion 8 (coil end portion on the upper side of FIG. 2) projecting from the first-end surface 7 of the stator core 2, bent in a radially inner direction R1, and extending in a circumferential direction M to couple the slot conductor portions 11 separated at a predetermined interval, and the second-end side coil end portion 10 (coil end portion on the lower side of FIG. 2) projecting from the second-end surface 9 of the stator core 2 and extending in the circumferential direction M to couple the slot conductor portions 11 separated at a predetermined interval. Both the coil end portions 8, 10 are bent (folded) a plurality of number of times in the circumferential direction (for example, as indicated by Y) or in the axial direction (for example, as indicated by X) so as not to interfere with each other in the axial direction L or in the radial direction R.

Each rectangular wire W forming the coil 4 described above includes a plurality of straight portions 12, a plurality of continuous portions 13a, 13b, and a plurality of folded portions 14. The straight portions 12, which are equivalent to the slot conductor portions 11 described earlier, are disposed in the slots 5 of the stator core 2, and are formed to extend in parallel with the respective slots 5. The continuous portions 13a, 13b alternately connect first-end portions and second-end portions of adjacent ones of the straight portions 12 with each other, and are formed by folding the end portions of the straight portions at a right angle. The folded portions 14 are formed by folding radially inward the straight portions 12 on the first-end side. The continuous portions 13a, 13b and the folded portions 14 are equivalent to the coil end portions 8, 10 described earlier.

Thus, the first-end portions of the folded portions 14 are connected with each other by the continuous portions 13a on the first-end side, and the continuous portions 13a on the first-end side are located radially inwardly of the straight portions 12. In contrast, the continuous portions 13b on the second-end side are positioned on a circle connecting the straight portions 12 or radially outwardly of the straight portions 12. In the case where the continuous portions 13b on the second-end side are positioned radially outwardly of the straight portions 12, the second-end portions of the straight portions 12 are folded radially outward to form folded portions 14 (see FIGS. 10 to 20 to be described later) so that second-end portions of the folded portions 14 are connected with each other by the continuous portions 13b on the second-end side. A plurality of the thus configured rectangular wires W are combined such that the straight portions 12 are disposed side by side in the circumferential direction and in the radial direction to form the coil 4 in a generally cylindrical overall shape. Then, the coil 4 is disposed in the stator core 2 by distributed winding to form the stator 1.

A stator manufacturing apparatus 20 that disposes the coil 4 described above in the stator core 2 will be described with reference to FIGS. 3 to 7. The manufacturing apparatus 20 includes an insertion jig 21 made of a material having a sufficient rigidity such as stainless steel, for example, a restriction jig 22 in which a plurality of restriction pieces 22a also having a sufficient rigidity are disposed, an ascending/descending mechanism 23 that moves (ascends and descends) the insertion jig 21 in the axial direction, a movement mechanism 24 that moves the restriction jig 22 in the radial direction, and a fixation table 25 on which the stator core 2 is placed. The insertion jig 21 includes a generally cylindrical body portion 21a, a circular plate portion 21b provided at a first-end portion (upper-end portion in FIGS. 3, 7, and 9 to 20) of the body portion 21a in the axial direction (up-down direction in FIGS. 3, 7, and 9 to 20), and a circular ring portion 21c disposed around the circular plate portion 21b to support a plurality of protruding pins 28 to be described later. The coil 4 described earlier is removably attachable to the insertion jig 21 in the axial direction (see FIGS. 10 to 20 to be described later). A part of the continuous portions 13a and the folded portions 14 on the first-end side of the coil 4 are sequentially placed on the circular plate portion 21b. This allows the coil 4 to be positioned with respect to the insertion jig 21 in the axial direction.

Figure 4A:
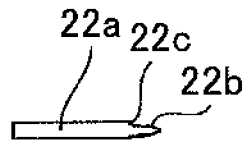
FIG. 4A is a plan view showing one restriction piece.
Figure 4B:
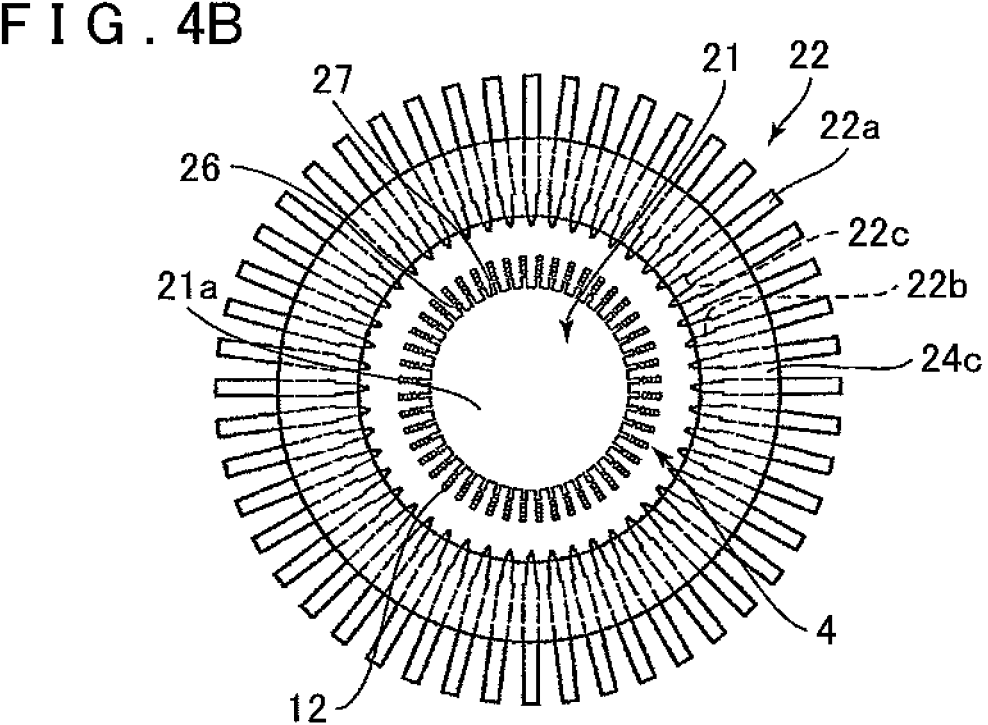
FIG. 4B shows a state in which a plurality of restriction pieces are disposed around an insertion jig in which a coil is disposed.
Figure 4C:
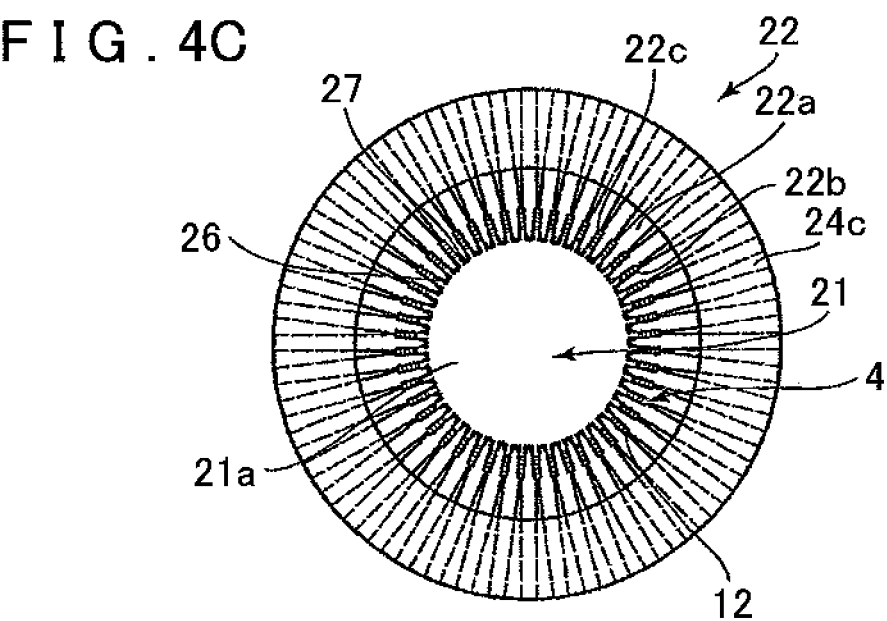
FIG. 4C shows a state in which the restriction pieces are moved radially inward from the state of FIG. 4B to be disposed between adjacent ones of straight portions of the coil, FIGS. 4B and 4C being shown as partially omitted and showing the coil as cut away.

As shown in FIGS. 4A to 4C, the body portion 21a of the insertion jig 21 includes a plurality of projections 26 provided at a plurality of locations on the outer peripheral surface so as to protrude in the radial direction. In FIGS. 3 and 10 to 20, the projections 26 are not shown. The projections 26 are positioned in alignment with the slots 5 of the stator core 2 in which the projections 26 are to be inserted. Therefore, the projections 26 are located in the same phase as the slots 5 in the circumferential direction, and the number of the projections 26 is the same as the number of the slots 5. The projections 26 are formed such that the cross section of each projection 26 that is orthogonal to the axial direction of the body portion 21a is rectangular along the axial direction. The orientation of side surfaces of the projections 26 on the radially outer side corresponds to the direction in which the slots 5 are formed. That is, the slots 5 are formed in the radial direction of the stator core 2, and therefore the side surfaces of the projections 26 on the radially outer side are orthogonal to the radial direction. Preferably, the side surfaces (outer peripheral surfaces) of the projections 26 on the radially outer side are made smoother, such as by improving the surface roughness, than surfaces of the slots 5 of the stator core 2 to facilitate attachment and removal of the straight portions 12 of the coil 4 as described later.

The amount of protrusion of the projections 26 is slightly larger than the diameter of a circle inscribed in the teeth 6 of the stator core 2. As described later, radially inner side surfaces of the straight portions 12 forming a rectangular wire W on the radially innermost side, of the rectangular wires W disposed on the projections 26, are positioned radially outwardly of distal-end surfaces of the teeth 6 with the rectangular wires W disposed in the slots 5. This makes it possible, for example, to dispose a magnetic wedge at an opening portion of the slots 5 or to secure the creepage distance between the straight portions 12 and the distal-end surfaces of the teeth 6. Therefore, the amount of protrusion of the projections 26 is adjusted in accordance with the radial position of the rectangular wire W located on the radially innermost side of the coil 4 in the slots 5. The width of the projections 26 in the circumferential direction is slightly smaller than the width of the slots 5 in the circumferential direction.

Portions of the outer peripheral surface of the body portion 21a of the insertion jig 21 other than the projections 26 are formed as recesses 27. The diameter of a circle inscribed in the bottoms of the recesses 27 is slightly smaller than the diameter of the circle inscribed in the teeth 6, and the width of each recess 27 in the circumferential direction is slightly larger than the width of each tooth 6 in the circumferential direction. The teeth 6 can be respectively disposed in the recesses 27. By forming the projections 26 and the recesses 27 on the outer peripheral surface of the insertion jig 21 as described above, when the coil 4 formed in a cylindrical shape and the stator core 2 are disposed on the outer peripheral surface of the insertion jig 21, the cylindrical center of the coil 4 and the cylindrical center of the inner peripheral surface of the stator core 2 can coincide with each other accurately, which allows the coil 4 to be disposed in the slots 5 of the stator core 2 at equal intervals with no displacement in the radial direction. The recesses 27 allow the distal-end portions of the plurality of restriction pieces 22a, which will be described later, to pass therethrough.

The plurality of protruding pins 28 serving as protruding portions supported by the circular ring portion 21c are disposed at a plurality of locations in the circumferential direction on the first-end surface of the body portion 21a in the axial direction to protrude toward the first-end side in the axial direction. With the insertion jig 21 (circular ring portion 21c) disposed concentrically with the stator core 2, the protruding pins 28 are disposed at positions adjacent to the distal-end surfaces of the teeth 6 in the radial direction (on the radially inner side). As shown in FIGS. 10 to 19 to be described later, the amount of protrusion of the protruding pins 28 in the axial direction is set such that with all the rectangular wires W disposed in the insertion jig 21 to form the coil 4, the protruding pins 28 protrude more than the folded portions 14 of the rectangular wires W overlapped in the axial direction (the height of the folded portions 14 in the axial direction). In the embodiment, the amount of protrusion of the protruding pins 28 are set in consideration of room for disposing an opening jig 29.

Figure 5A:
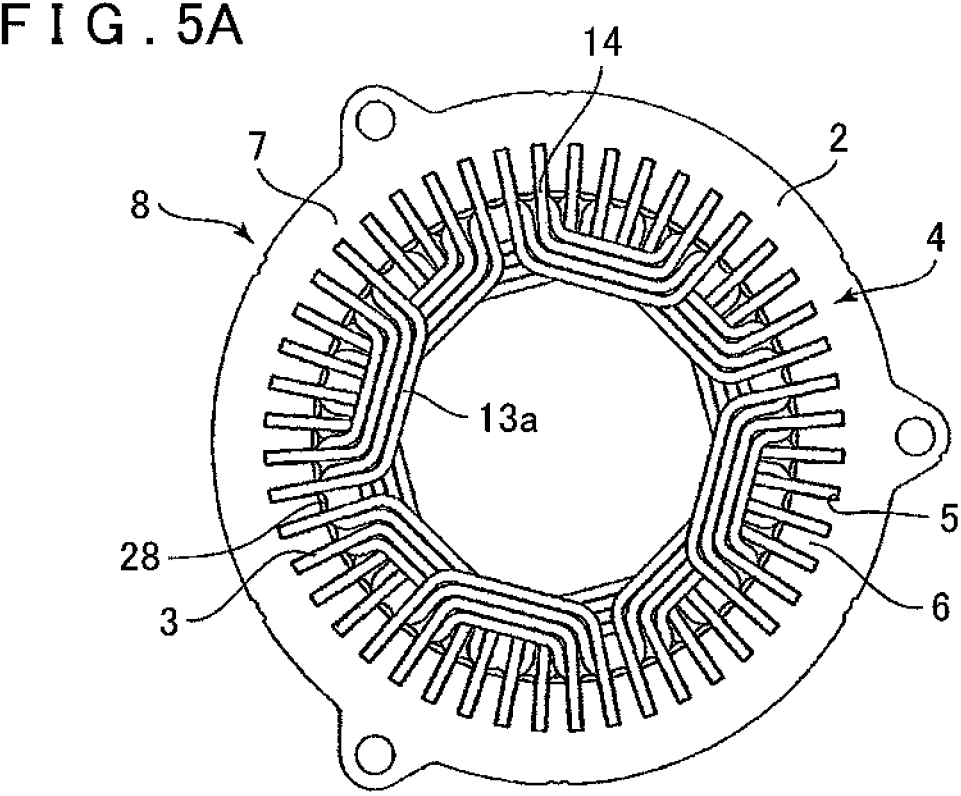
FIG. 5A is a plan view showing the relationship between a plurality of protruding portions provided on the insertion jig and slots of a stator core and the straight portions of the coil.
Figure 5B:
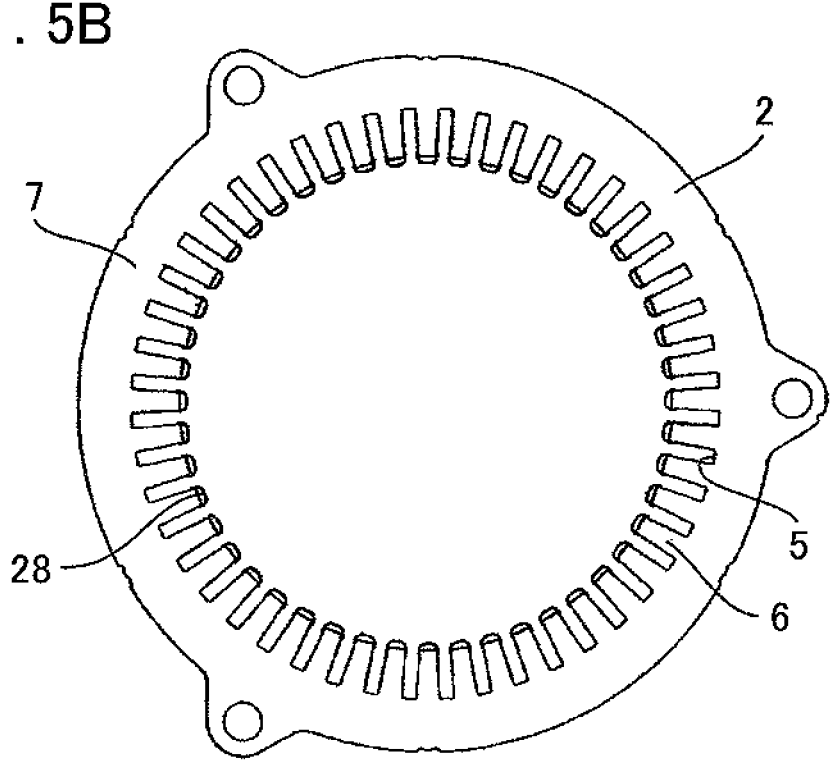
FIG. 5B is a plan view showing the relationship between the protruding portions and the slots of the stator core with the coil omitted.
Figure 6:
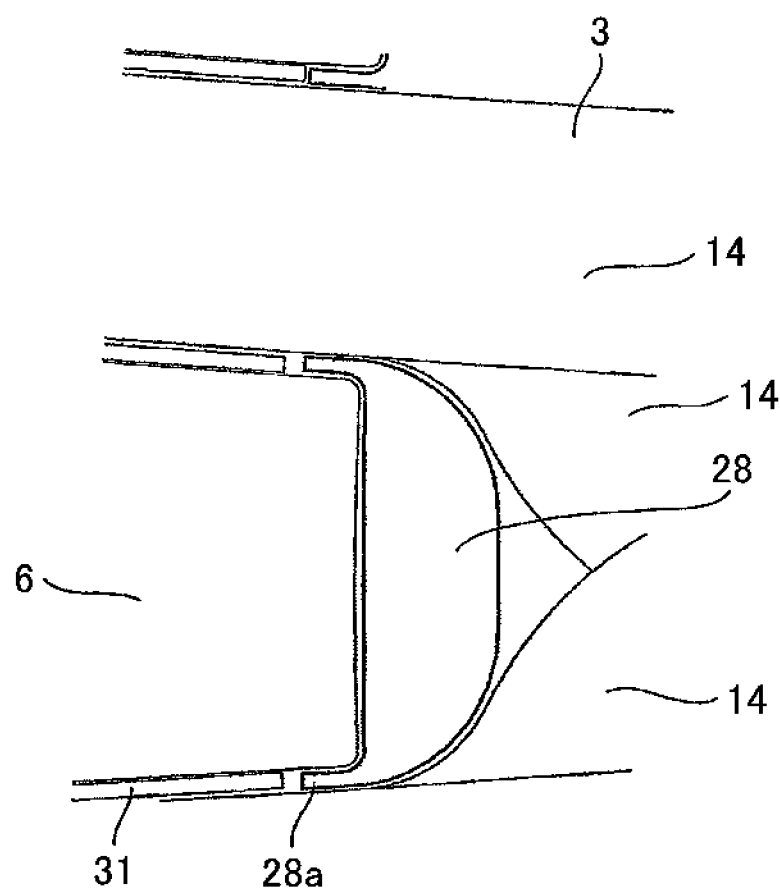
FIG. 6 shows a part of FIGS. 5A and 5B as enlarged.
Figure 6:
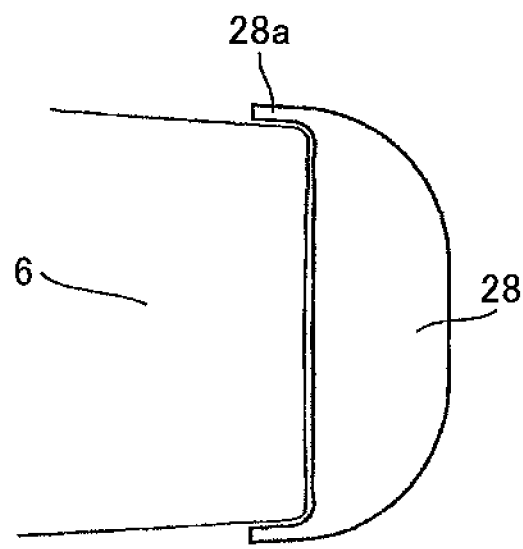

As shown in FIGS. 5A, 5B and 6, the shape of a cross section of the protruding pins 28 that is orthogonal to the axial direction matches the shape of an area surrounded by the teeth 6 and the coil 4. That is, with the coil 4 disposed in the stator core 2 by distributed winding as shown in FIGS. 5A and 5B, the distal end of each tooth 6 is surrounded by the folded portions 14 of the rectangular wires W. The folded portions 14 are formed in a crank shape depending on the position at which the folded portions 14 are disposed. Therefore, as shown in detail in FIG. 6, the area at the distal end of each tooth 6 surrounded by the folded portions 14 is in a generally triangular shape at smallest. Thus, by setting the cross-sectional shape of the protruding pins 28 to a shape matching the generally triangular shape, the protruding pins 28 can be disposed in any of the areas surrounded by the teeth 6 and the folded portions 14 at any position in the circumferential direction. In the embodiment, in order to restrict the clearance between the slots 5 and the straight portions 12 of the coil 4, a projecting streak 28a is provided at both ends, in the circumferential direction, of a side surface of each protruding pin 28 on the tooth 6 side to cover the distal end of the tooth 6.

By disposing the protruding pins 28 as described above, any of the folded portions 14 disposed in the circumferential direction contacts the protruding pins 28 when mounting the coil 4 to the insertion jig 21 as described later to appropriately restrict the circumferential positions of the straight portions 12. In particular, by setting the cross-sectional shape of the protruding pins 28 to the shape described above, the straight portions can be positioned in the circumferential direction more accurately. The protruding pins 28 are not limited to the shape described above, and may have a circular cross section, for example, as long as the protruding pins 28 can be disposed in the areas surrounded by the teeth 6 and the folded portions 14. It should be noted, however, that the protruding pins 28 in the shape according to the embodiment can restrict the phase of the straight portions 12 in the circumferential direction more accurately.

The insertion jig 21 configured as described above can be ascended and descended in the axial direction by the ascending/descending mechanism 23. The ascending/descending mechanism 23 is composed of an ascending/descending plate 23a on which the insertion jig 21 is placed, an ascending/descending shaft 23b fixed to the lower surface of the ascending/descending plate 23a, a drive mechanism 23c that advances and retracts the ascending/descending shaft 23b in the axial direction, and so forth. The ascending/descending mechanism 23 is fixed to a frame 20a of the manufacturing apparatus 20, and advances and retracts the ascending/descending shaft 23b in the axial direction through the drive mechanism 23c which is driven electrically or hydraulically. This allows the ascending/descending plate 23a, which is fixed to the distal end of the ascending/descending shaft 23b, to be ascended and descended together with the insertion jig 21 with respect to the frame 20a.

In the restriction jig 22 forming the manufacturing apparatus 20, the large number of restriction pieces 22a, the number of which is the same as the number of the teeth 6, are disposed around the insertion jig 21 to extend along the radial direction. The restriction pieces 22a have a width matching the intervals between the slots 5 which are adjacent in the circumferential direction, and are disposed between the straight portions 12 which are adjacent in the circumferential direction of the coil 4 so as to be freely advanced and retracted. Each restriction piece 22a has, at its distal-end portion, a contact portion 22b disposed between the straight portions 12 to contact side surfaces of the straight portions 12. As shown in FIGS. 4A to 4C, the contact portions 22b are formed in a conical shape with a diameter reduced toward the distal end.

That is, the straight portions 12 are disposed side by side in the radial direction, and therefore the intervals between the straight portions 12 which are adjacent in the circumferential direction become smaller toward the radially inner side. Therefore, it is necessary that portions of the restriction pieces 22a that are to be disposed between the straight portions 12 should be shaped to have a smaller width toward the distal end. In addition, the restriction pieces 22a move relatively while contacting the side surfaces of the straight portions 12 as described later. Therefore, it is preferable to reduce the contact area in order to reduce the sliding resistance. Thus, by forming the contact portions 22b of the restriction pieces 22a in a conical shape as in the embodiment, variations in intervals between the adjacent ones of the straight portions 12 along the radial direction can be accommodated, and the area of contact with the straight portions 12 can be reduced. Only if some increase in sliding resistance is tolerated, the contact portions 22b may have a triangular shape, for example, matching variations in intervals between the adjacent ones of the straight portions 12 in the radial direction.

Each restriction piece 22a has a stepped surface 22c at its middle portion (base-end portion of the contact portion 22b). That is, a step is provided at the middle portion of the restriction piece 22a, and a surface at the step that is orthogonal to the axial direction of the restriction piece 22a {left-right direction of FIG. 4A} is defined as the stepped surface 22c. The diameter of the stepped surface 22c is larger than the interval between the straight portions 12 which are located on the radially outermost side of the coil 4 and which are adjacent in the circumferential direction. Thus, as shown in FIG. 4C, with the distal-end portions of the restriction pieces 22a advanced between the adjacent ones of the straight portions 12, the stepped surfaces 22c contact a circle formed on the radially outer side of the straight portions 12 located on the radially outermost side. The stepped surfaces 22c may be formed, for example, by providing a flange at the base-end portions of the contact portions 22b of the restriction jig 22.

The restriction pieces 22a configured as described above are movable in the radial direction by the movement mechanism 24. The movement mechanism 24 includes rails 24a fixed to the frame 20a of the manufacturing apparatus 20 and disposed around the body portion 21a of the insertion jig 21, a plurality of sliders 24b that are movable on the rail 24a in the radial direction and that are respectively fixed to the restriction pieces 22a, circular ring-shaped guide plates 24c disposed above and below the restriction jig 22 to guide movement of the restriction pieces 22a, a drive mechanism (not shown) that drives the sliders 24b, and so forth. The movement mechanism 24 advances and retracts the sliders 24b in the radial direction through the drive mechanism that is driven electrically or hydraulically. This allows the restriction pieces 22a, which are respectively fixed to the sliders 24b, to move closer to and away from the insertion jig 21 in the radial direction while being guided by the guide plates 24c.

The restriction jig 22 and the movement mechanism 24 are ascended together with the insertion jig 21 to a predetermined position by the ascending/descending mechanism 23, but are kept stationary at the predetermined position irrespective of any ascent of the insertion jig 21. That is, the restriction jig 22 and the movement mechanism 24 are disposed on a support plate 24d, which is supported by the ascending/descending plate 23a via a spring 24e. Thus, the restriction jig 22 and the movement mechanism 24 are ascended and descended via the support plate 24d by ascending and descending the ascending/descending plate 23a. However, the restriction jig 22 and the movement mechanism 24 are ascended until they contact the fixation table 25 of the stator core 2, and are not ascended any further irrespective of any ascent of the ascending/descending plate 23a. That is, when the ascending/descending plate 23a is ascended by the ascending/descending mechanism 23, the restriction jig 22 and the movement mechanism 24 are ascended together with the support plate 24d. When a part of the movement mechanism 24 (for example, the guide plate 24c) contacts the fixation table 25, ascent of the support plate 24d, the restriction jig 22, and the movement mechanism 24 is stopped. Then, the spring 24e is elastically deformed to allow the ascending/descending plate 23a to ascend further. In the case of descent, on the other hand, the support plate 24d, the restriction jig 22, and the movement mechanism 24 are descended with a delay compared to the ascending/descending plate 23a because of the relationship between the elastic restoration force of the spring 24e and the weight of the support plate 24d, the restriction jig 22, and the movement mechanism 24.

The mechanism that ascends the restriction jig 22 and the movement mechanism 24 to the predetermined position may be different from the mechanism which uses the spring described above, and may be any mechanism that ascends the restriction jig 22 and the movement mechanism 24 in conjunction with the ascending/descending mechanism 23 to the predetermined position and that stops ascending the restriction jig 22 and the movement mechanism 24 at the predetermined position irrespective of ascending operation of the ascending/descending mechanism 23. Alternatively, a mechanism that ascends and descends only the restriction jig 22 and the movement mechanism 24 may be provided separately from the ascending/descending mechanism 23.

The fixation table 25 serving as a retention jig that retains the stator core 2 placed thereon is disposed above the insertion jig 21 and the restriction jig 22 described above. The fixation table 25 is placed on and fixed to the frame 20a of the manufacturing apparatus 20 (although shown as separate in FIG. 3). A step 25a is provided in the center portion of the fixation table 25 so that the stator core 25 can be disposed in the step 25a with no chattering. This allows the stator core 2 to be positioned and disposed concentrically with the insertion jig 21. The fixation table 25 also has a circular hole 25b, the outside diameter of which is larger than a circle circumscribed about the slots 5 of the stator core 2 and is smaller than the outside diameter of the stator core 2, so that the insertion jig 21 to which the coil 4 is mounted can pass inside the circular hole 25b. In place of the fixation table 25 described above, an element that grasps the stator core 2 such as a chuck, for example, may be used as the retention jig.

Figure 7A:
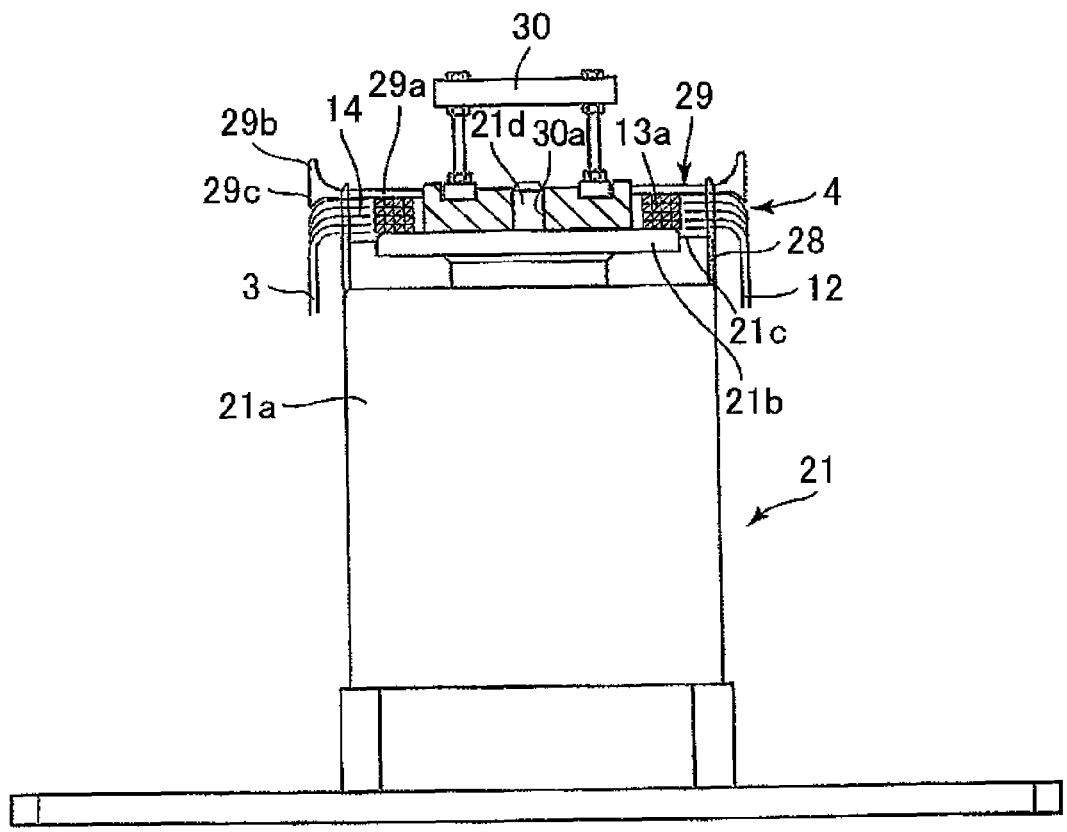
FIG. 7A is a cross-sectional view showing, as partially omitted, a state in which an opening jig is disposed in the stator manufacturing apparatus.
Figure 7B:
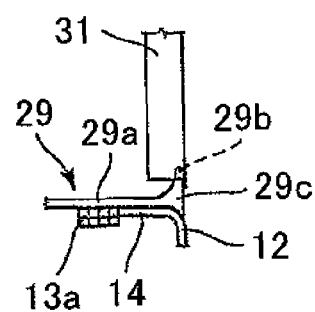
FIG. 7B is an extraction of FIG. 7A showing the positional relationship between the opening jig and an insulating sheet.

In the embodiment, as shown in FIGS. 7A and 7B, a plurality of opening jigs 29 are provided to spread an insulating sheet 31 disposed in the slots 5 such that the straight portions 12 can be disposed in the insulating sheet 31. The insulating sheet 31 is formed in a shape matching the shape of the slots 5 by folding both end portions, in the width direction, of a long plate-like sheet in the same direction. The opening jigs 29 have a width matching the width, in the circumferential direction, of the insulating sheet 31 disposed in the slots 5. Therefore, the opening jigs 29 have a width that is the same as or slightly larger than the width, in the circumferential direction, of the straight portions 12 of the coil 4, for example. In the case where the corners of the upper surfaces of the folded portions 14 of the straight portions 12 on the first-end side are chamfered, the width of the opening jigs 29 may be made smaller than the width of the straight portions 12 such that the opening jigs 29 can be accommodated in the chamfered corners. Each opening jig 29 is composed of a plate-like placement portion 29a to be placed on the folded portions 14 positioned on the first-end surface (uppermost surface) of the coil 4 in the axial direction, and an opening portion 29b and a guide portion 29c protruding in the thickness direction of the placement portion 29a (up-down direction of FIGS. 7A and 7B) from a one-end portion {right-end portion in FIG. 7B} of the placement portion 29a.

The opening jigs 29 are disposed around a placement jig 30, and are placed on the upper surface of the coil 4. That is, the other-end portion {left-end portion in FIG. 7B} of each opening jig 29 is fixed to the outer peripheral surface of the placement jig 30 so that the opening jigs 29 are movable together with the placement jig 30. The placement jig 30 has an outside diameter that is sufficiently smaller than the circle inscribed in the teeth 6 of the stator core 2 so that the placement jig 30 can pass through the stator core 2. The placement jig 30 has, at its center, a fitting hole 30a that can be fitted with a positioning projection 21d provided on the upper-end surface of the insertion jig 21. With the placement jig 30 disposed on the upper surface of the insertion jig 21, the positioning projection 21d and the fitting hole 30a are fitted with each other with no chattering so as to position the placement jig 30 and place the opening jigs 29, which are fixed around the placement jig 30, on the upper surface of the coil 4.

In this state, the distal-end portions of the opening portions 29b are disposed in the insulating sheet 31 disposed in the slots 5 to maintain the end portion of the insulating sheet 31 in an open state. The corners at the distal-end portions of the opening portions 29b are chamfered. With the opening jigs 29 placed on the upper surface of the coil 4 as described above, the guide portions 29c cover a curved surface between the folded portions 14 positioned on the uppermost surface and radially outer surfaces of the straight portions 12 which are positioned on the radially outermost side and which are continuous with the folded portions 14.

In the embodiment, as described later, the opening jigs 29 are inserted together with the coil 4 into the stator core 2 with the opening jigs 29 placed on the upper surface of the coil 4. In this event, the opening portions 29b of the opening jigs 29 are moved in the insulating sheet 31 disposed in the slots 5 such that portions of the insulating sheet 31 that are folded in the width direction will not come closer to each other to be closed, that is, so as to spread the insulating sheet 31. With the guide portions 29c covering the curved surface, the radially outer surfaces of the straight portions 12 positioned on the radially outermost side are easily guided into the insulating sheet 31. That is, without the guide portions 29c, the insulating sheet 31 might interfere with the curved surface to come off from the slots 5 during insertion of the coil 4. In the embodiment, however, the guide portions 29c cover the curved surface to prevent occurrence of such an incident.

In the embodiment, a portion connecting the guide portion 29c and the placement portion 29a is curved along the curved surface described above to easily secure the rigidity of the opening jig 29. The radially outer surfaces of the opening portions 29b and the guide portions 29c and the radially outer surfaces of the straight portions 12 on the radially outermost side are preferably flush with each other. However, the radially outer surfaces of the opening portions 29b and the guide portions 29c may be slightly displaced radially inwardly of the radially outer surfaces of the straight portions 12 as long as interference between the curved surface and the insulating sheet 31 can be prevented, or may be slightly displaced radially outwardly of the radially outer surfaces of the straight portions 12 as long as such displacement falls within the range of clearance between the radially outer surfaces of the straight portions 12 and the insulating sheet 31.

Figure 8:
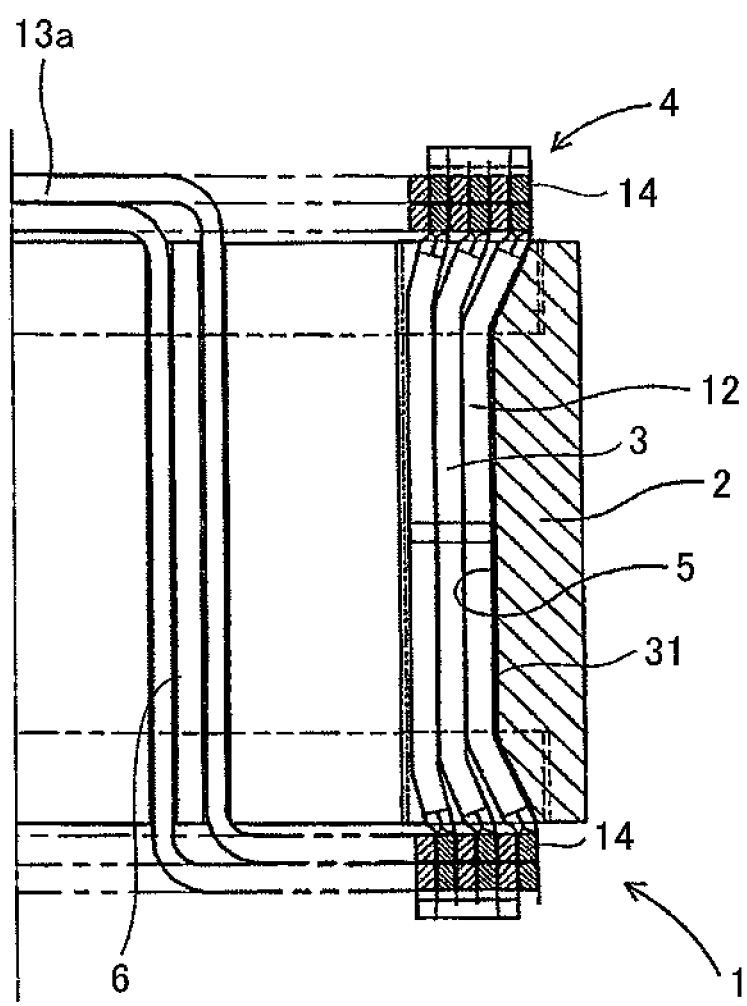
FIG. 8 is a half cross-sectional view showing, as partially omitted, another example of a stator in which a coil is disposed in slots.
Figure 9:
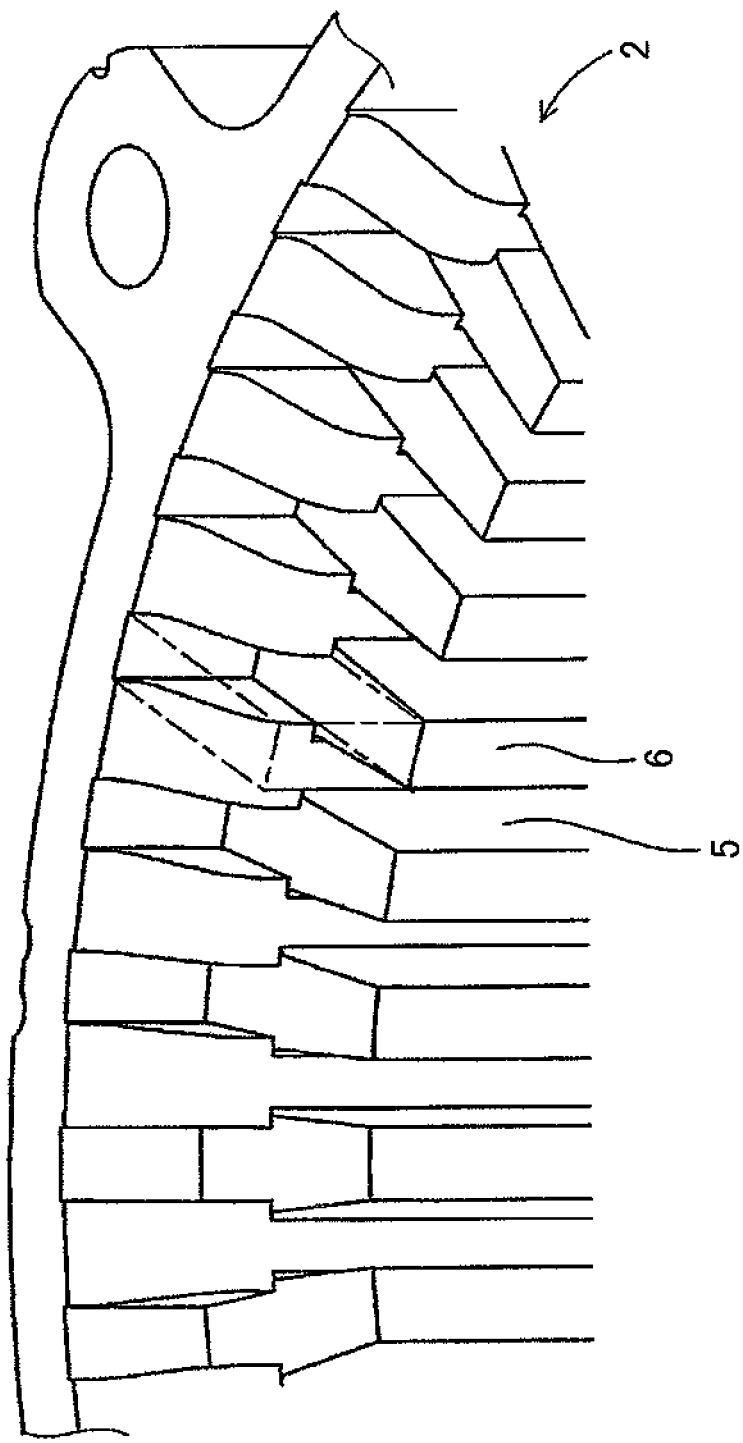
FIG. 9 is a partial perspective view showing the shape of end portions of the slots of the stator.

The structure in which the opening jigs 29 spread the insulating sheet 31 as described above is particularly effective in the case where the insulating sheet 31 has a shape described next. That is, as shown in FIGS. 8 and 9, in the case of a structure in which a coil 4 with both end portions of the straight portions 12 in the axial direction sloped radially outward is incorporated into the stator core 2, it is necessary that end portions of the slots 5 of the stator core 2 should be sloped so as to conform to the shape of the end portions of the straight portions 12. In this case, it is necessary that the insulating sheet 31 to be disposed in the slots 5 should also be formed to conform to the shape of the slots 5.

For example, the insulating sheet 31 to be applied to a structure in which the end portions of the slots 5 are not sloped can be formed to conform to the shape of the slots 5 by just folding both end portions, in the width direction, of a long plate-like sheet in the same direction as described earlier. In contrast, in the case where the end portions of the insulating sheet 31 are to be sloped, the insulating sheet 31 is formed to conform to the shape of the slots 5 such as by slitting the end portions of the insulating sheet 31. This makes it difficult to secure the rigidity of the end portions of such an insulating sheet 31 compared to the insulating sheet 31 to be applied to a structure in which the end portions of the slots 5 are not sloped, and both ends of the insulating sheet 31 may come closer to each other to be closed with the insulating sheet 31 disposed in the slots 5. Therefore, with no measures taken, if the insulating sheet 31 is closed or halfway closed, the folded portions 14 may interfere with the insulating sheet 31 during insertion of the coil 4 into the slots 5, which may possibly cause the insulating sheet 31 to come off from the slots 5 or cause the end portions of the insulating sheet 31 to be turned up so that the insulating sheet 31 is caught during the insertion.

In contrast, by using the opening jigs 29 described above in a structure in which the insulating sheet 31 with end portions having a low rigidity is used as in the embodiment, it is possible to prevent the folded portions 14 from interfering with the insulating sheet 31 during insertion of the coil 4 to cause the insulating sheet 31 to be pushed by the coil 4 and come off from the slots 5 or cause the end portions of the insulating sheet 31 to be turned and caught.

Figure 10:
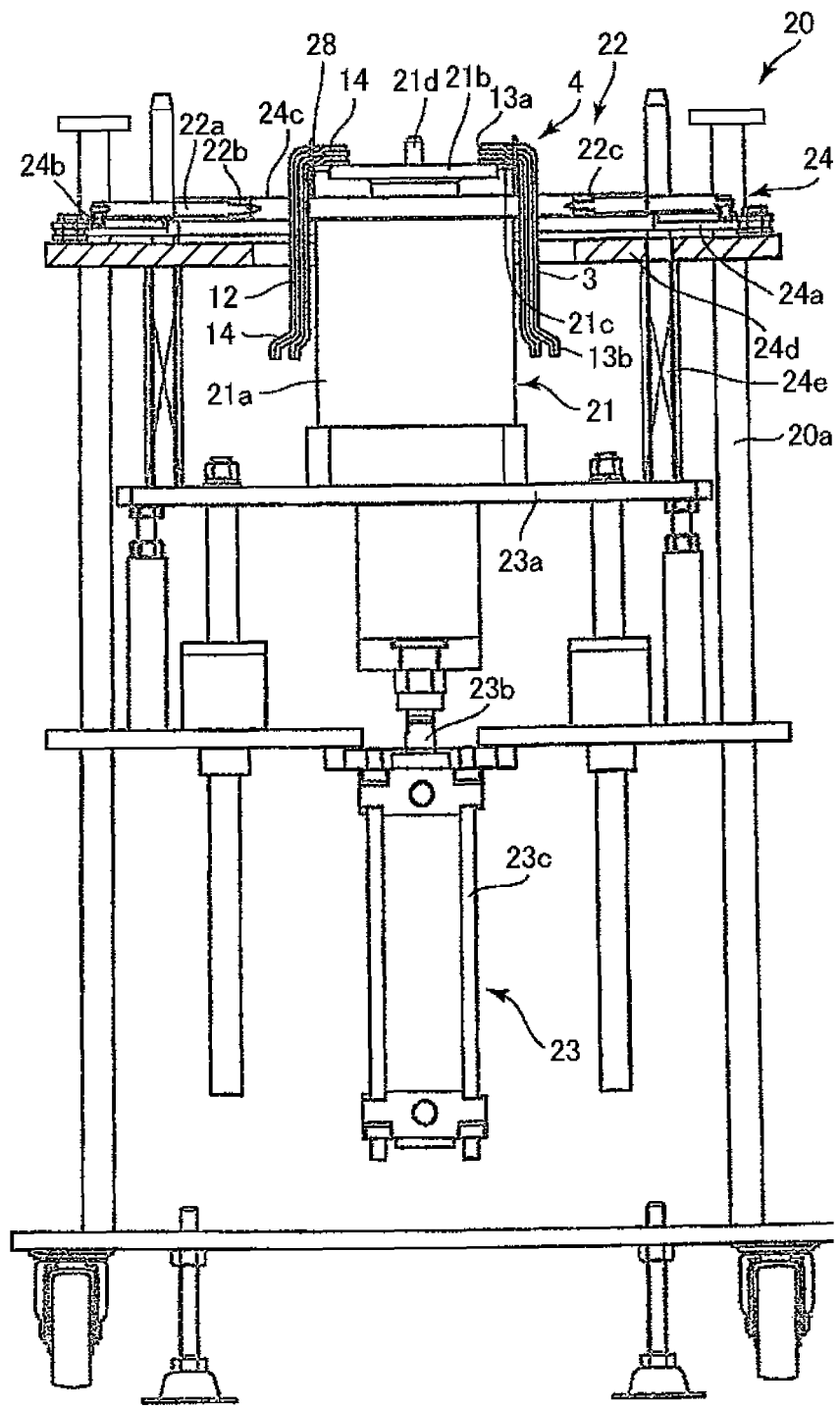
FIG. 10 shows a first step of a stator manufacturing method according to the embodiment of the present invention, showing the manufacturing apparatus as partially cut away and the coil as partially omitted.

Next, a stator manufacturing method in which the coil 4 is mounted in the stator core 2 to form the stator 1 using the manufacturing apparatus 20 described above will be described. First, as shown in FIG. 10, the rectangular wires W are sequentially mounted to the insertion jig 21 by distributed winding to mount the coil 4 to the insertion jig 21. That is, the rectangular wires W are sequentially assembled such that the folded portions 14 of the rectangular wires W are disposed between the predetermined protruding pins 28. Then, the straight portions 12 are disposed at the same intervals in the circumferential direction as the slots 5. At this time, the rectangular wires W are assembled such that the straight portions 12 of the rectangular wire W positioned on the radially innermost side extend along the radially outer surface of the projections 26 of the insertion jig 21 and the straight portions 12 are sequentially overlapped in the radial direction. This allows the coil 4, in which the straight portions 12 are arranged side by side in the circumferential direction and in the radial direction, to be mounted around the insertion jig 21.

Next, as shown in FIG. 11, the restriction pieces 22a are disposed between the adjacent ones of the straight portions 12 of the coil 4 on the first-end side in the axial direction, and on the second-end side with respect to the folded portions 14 in the axial direction. In this event, as shown in FIG. 4B and then FIG. 4C, the restriction pieces 22a are moved in the radial direction by the movement mechanism 24 to dispose the contact portions 22b of the restriction pieces 22a between the straight portions 12 and to cause the stepped surfaces 22c to contact the radially outer surfaces of the straight portions 12 on the radially outermost side. This allows the intervals between the adjacent ones of the straight portions 12 on the first-end side in the axial direction to match the intervals between the slots 5. That is, the straight portions 12 are positioned appropriately in the circumferential direction on the first-end side in the axial direction. Also, the radially outer surfaces of the straight portions 12 on the radially outermost side are positioned appropriately in the radial direction on the first-end side in the axial direction in consideration of the positions of the bottoms of the slots 5 in the radial direction.

Figure 12:
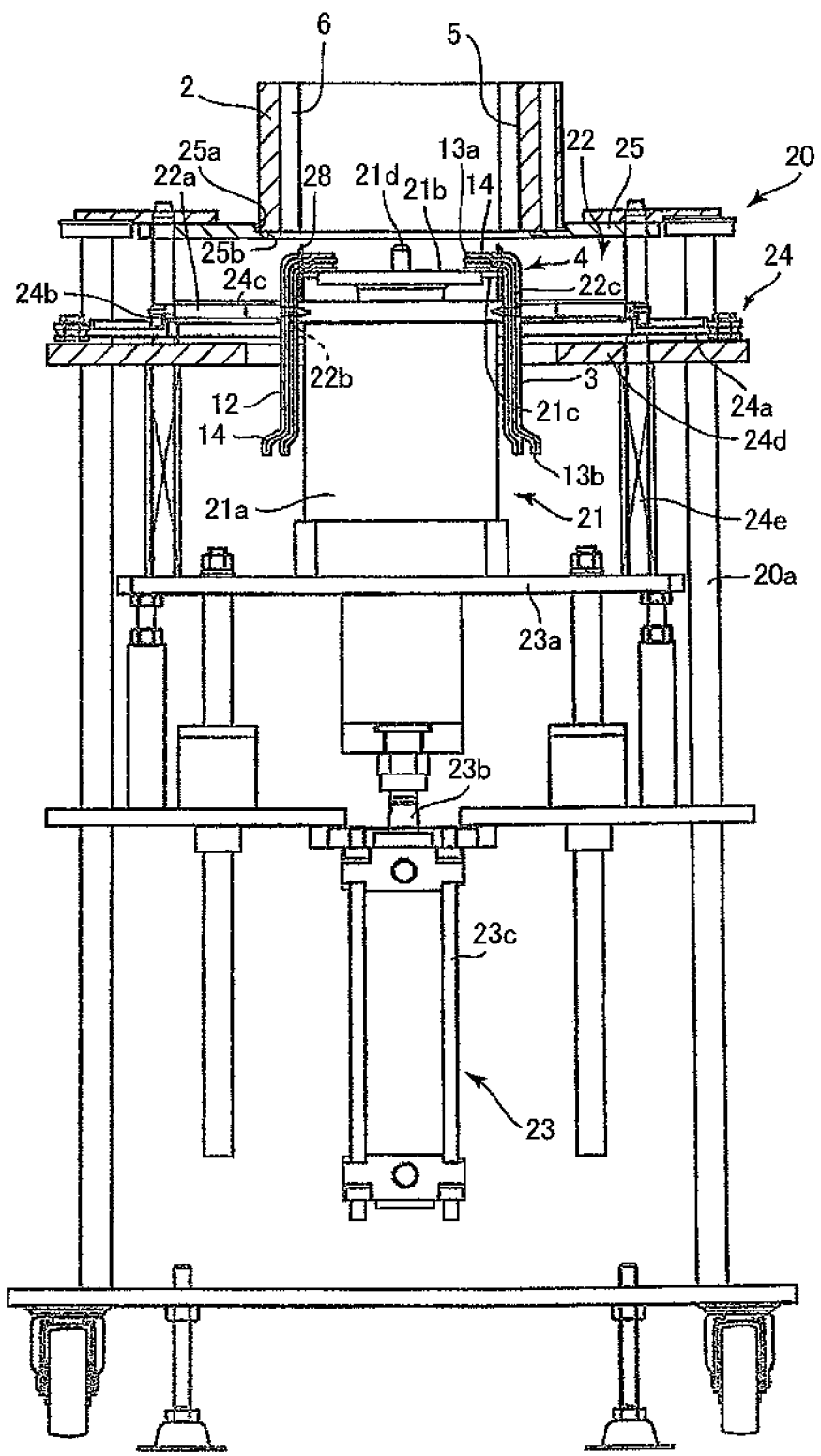
FIG. 12 shows a third step of the same stator manufacturing method, which is similar to FIG. 10.

Next, as shown in FIG. 12, the stator core 2, which is placed in the step 25a on the fixation table 25 with no chattering, is disposed together with the fixation table 25 on the upper side (a side of the first-end surface in the axial direction) of and in axial alignment with the insertion jig 21. In this event, the fixation table 25 is fixed at a predetermined position of the frame 20a. In this state, the stator core 2 is disposed concentrically with the insertion jig 21 and the coil 4. The slots 5 of the stator core 2 and the straight portions 12 are aligned with each other in the circumferential direction. The insulating sheet 31 is disposed in advance in the slots 5 of the stator core 2.

Figure 13:
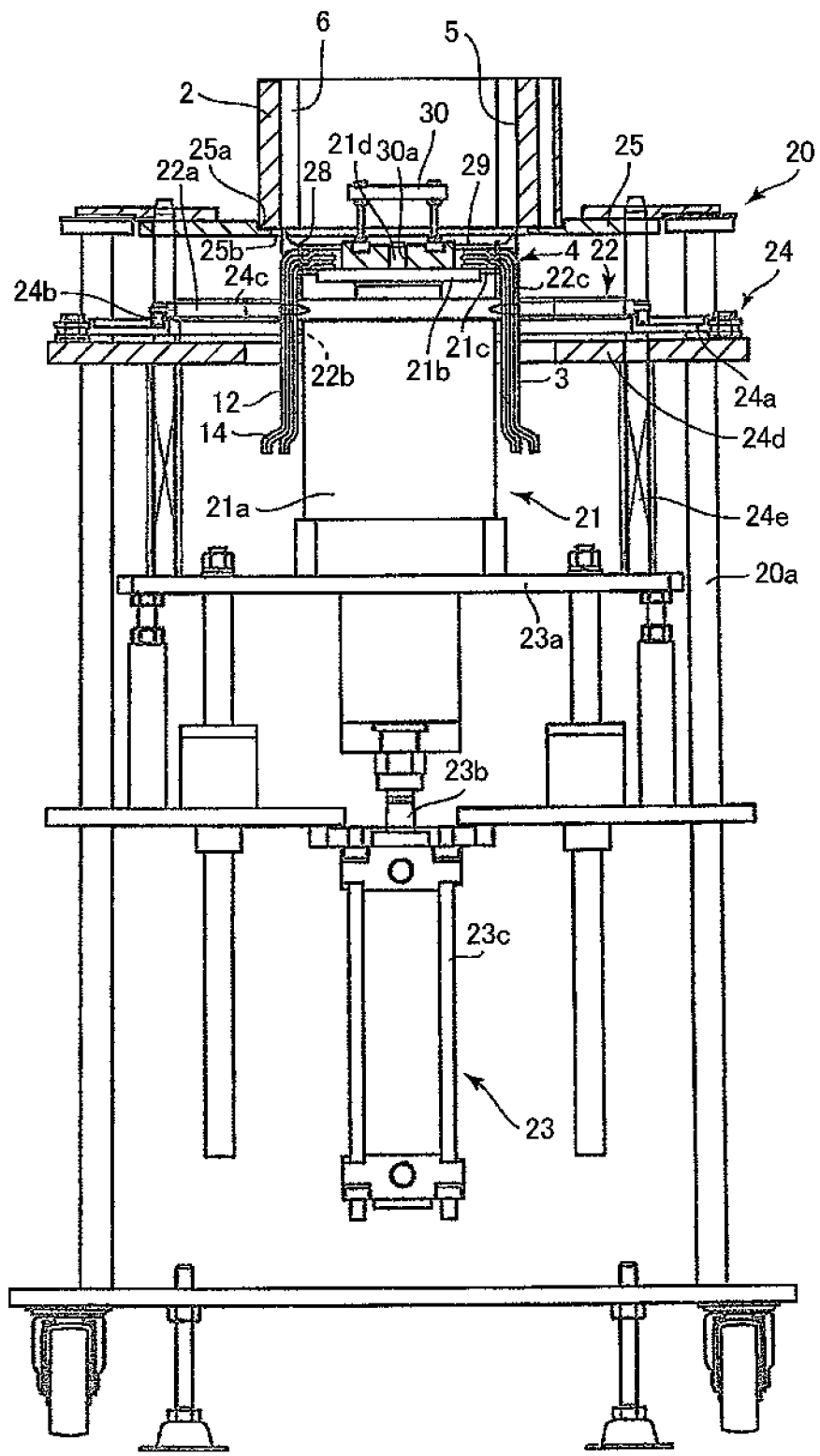
FIG. 13 shows a fourth step of the same stator manufacturing method, which is similar to FIG. 10.

Next, as shown in FIG. 13, the placement jig 30 to which the opening jigs 29 are fixed is inserted from the first-end side of the stator core 2 in the axial direction, that is, from a side opposite to the side from which the insertion jig 21 is inserted, to be placed on the insertion jig 21. In this event, the opening jigs 29 are inserted from openings of the slots 5 on an end surface opposite to the side from which the coil 4 is inserted (on the first-end surface in the axial direction) so as to spread the insulating sheet 31 disposed in advance in the slots 5. With the placement jig 30 placed on the upper surface of the insertion jig 21, the opening jigs 29 are placed on the upper side of the folded portions 14 on the uppermost side, and the distal-end portions of the opening portions 29b are disposed, that is, left, in the insulating sheet 31. The curved surface connecting the upper surfaces of the folded portions 14 on the uppermost side and the radially outer surfaces of the straight portions 12 on the radially outermost side is covered by the guide portions 29c.

Figure 14:
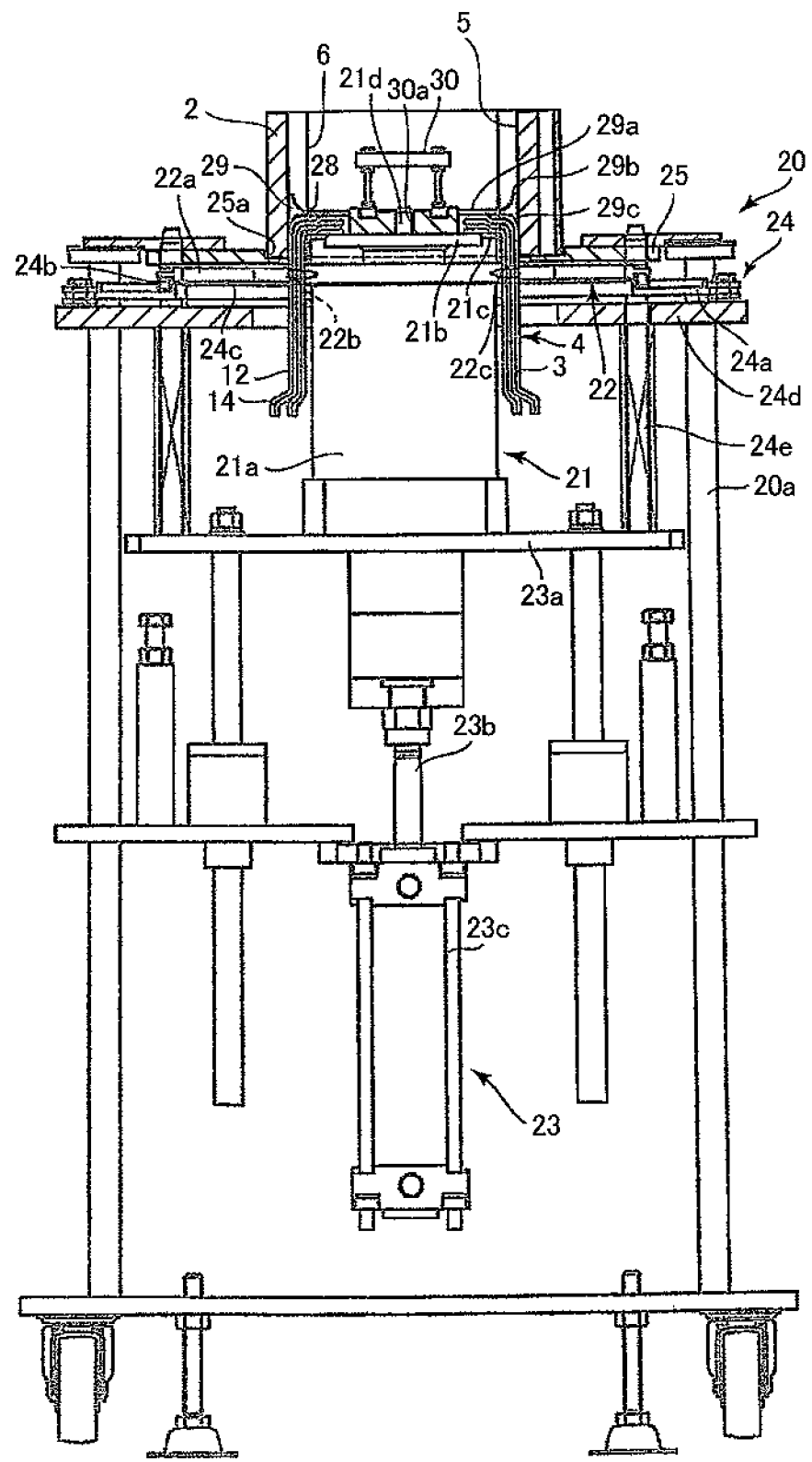
FIG. 14 shows a fifth step of the same stator manufacturing method, which is similar to FIG. 10.

Next, as shown in FIG. 14, the restriction jig 22 is moved together with the coil 4 and the insertion jig 21 closer to the stator core 2, that is, to the first-end side in the axial direction. Such movement is performed in conjunction with operation performed by the ascending/descending mechanism 23 to ascend the insertion jig 21. That is, the ascending/descending mechanism 23 ascends the ascending/descending plate 23a to ascend the restriction jig 22 and the movement mechanism 24 via the spring 24e and the support plate 24d. In this event, the opening jigs 29 are moved together with the insertion jig 21 to be moved within the insulating sheet 31 disposed in the slots 5. Of the coil 4, the folded portions 14 and the continuous portions 13a on the first-end side in the axial direction are advanced into the stator core 2, and the straight portions 12 located on the first-end side in the axial direction with respect to the restriction jig 22 are advanced into the insulating sheet 31 disposed in the slots 5. This allows the restriction jig 22 to approach the second-end surface of the stator core 2 in the axial direction.

Figure 15:
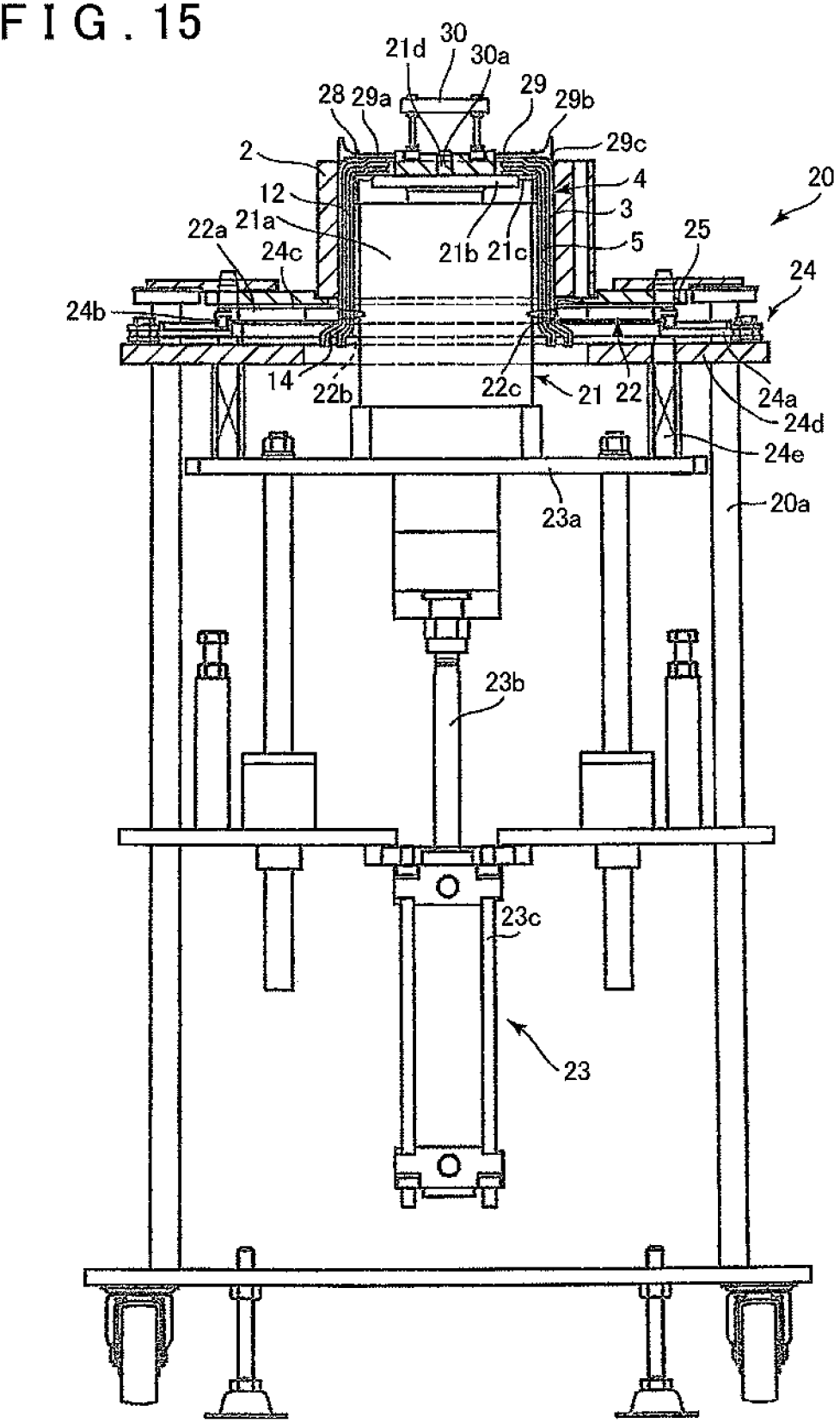
FIG. 15 shows a sixth step of the same stator manufacturing method, which is similar to FIG. 10.

Next, as shown in FIG. 15, the insertion jig 21 is further ascended (moved to the first-end side in the axial direction) with the restriction jig 22 kept stationary in the axial direction. That is, while ascent of the restriction jig 22 is stopped by the guide plate 24c contacting the fixation table 25, the spring 24e is elastically deformed to allow further ascent of the insertion jig 21. As a result, the restriction jig 22 moves relative to the coil 4 and the insertion jig 21 such that the restriction jig 22 moves from the first-end side to the second-end side of the coil 4 and the insertion jig 21 in the axial direction. This brings the contact portions 22b of the restriction pieces 22a of the restriction jig 22 and the side surfaces of the straight portions 12 into sliding contact with each other, which allows the straight portions 12 to be inserted into the slots 5 while restricting the circumferential positions of the straight portions 12 along the axial direction. In this event, the distal ends of the restriction pieces 22a pass inside the recesses 27 of the insertion jig 21. In FIG. 15, the recesses 27 are not shown. The insertion work is temporarily stopped before the folded portions 14 of the coil 4 on the second-end side in the axial direction interfere with the restriction jig 22.

Figure 16:
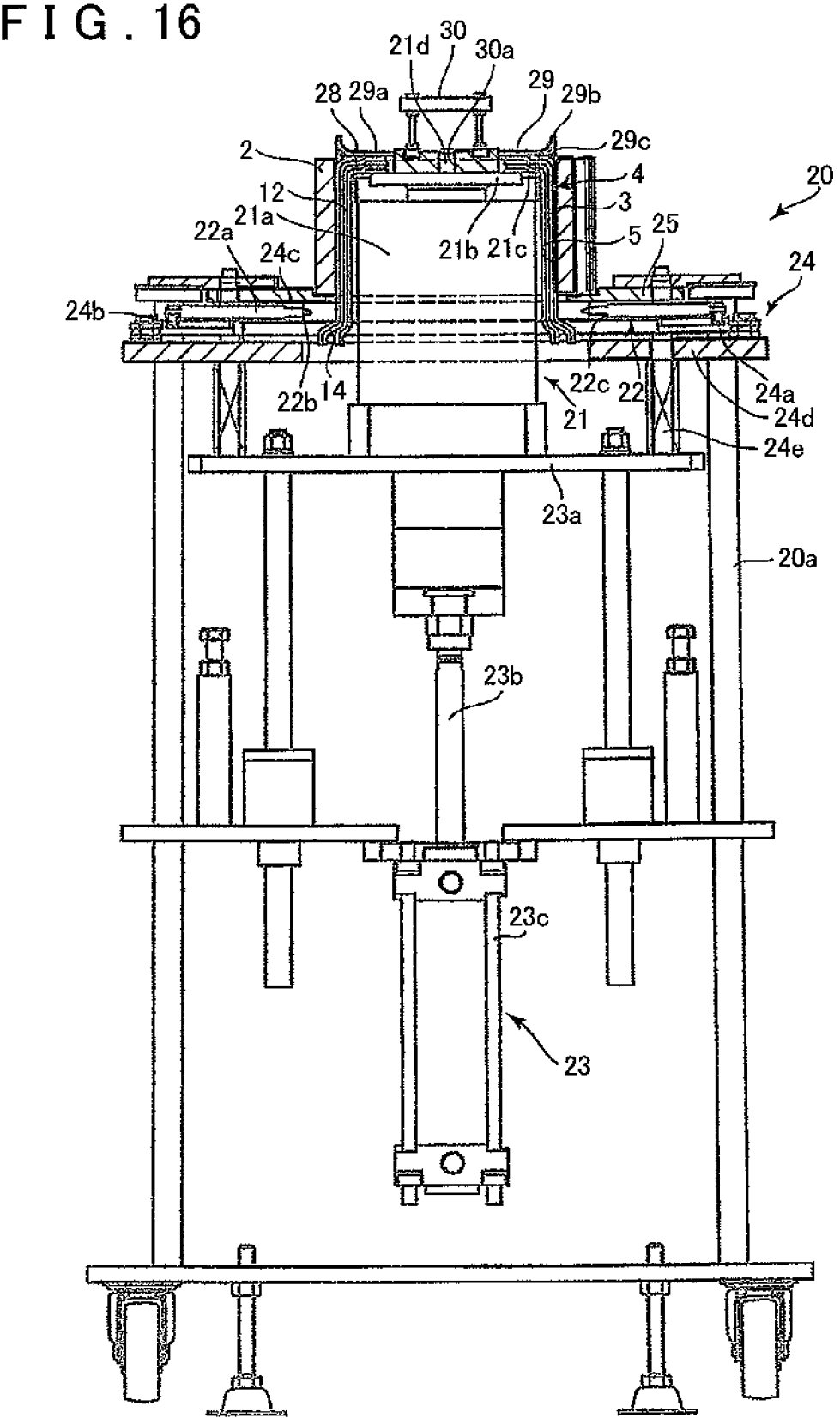
FIG. 16 shows a seventh step of the same stator manufacturing method, which is similar to FIG. 10.

Next, as shown in FIG. 16, with the work of inserting the coil 4 temporarily stopped, the restriction pieces 22a of the restriction jig 22 are retracted radially outward by the movement mechanism 24 to move the contact portions 22b of the restriction pieces 22a away from spaces between the adjacent ones of the straight portions 12. That is, the restriction pieces 22a are moved by the movement mechanism 24 from the state of FIG. 4C to the state of FIG. 4B.

Figure 17:
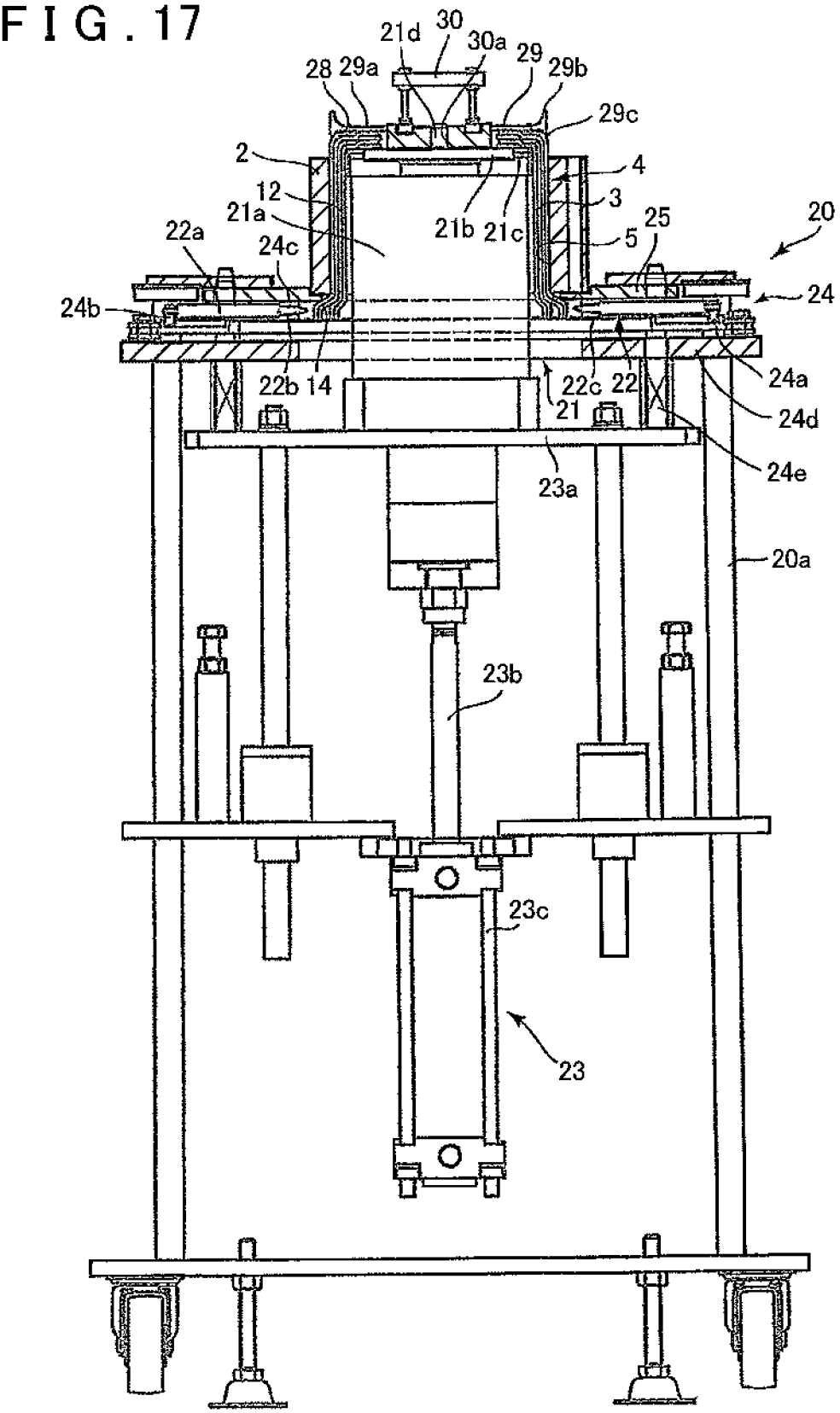
FIG. 17 shows an eighth step of the same stator manufacturing method, which is similar to FIG. 10.

Next, as shown in FIG. 17, the insertion jig 21 is ascended again by the ascending/descending mechanism 23 to dispose the coil 4 at a predetermined position in the stator core 2. In other words, the insertion jig 21 is ascended until the straight portions 12 are advanced to a predetermined position in the axial direction in the slots 5. In this event, the opening jigs 29 are completely taken out of the slots 5.

Figure 18:
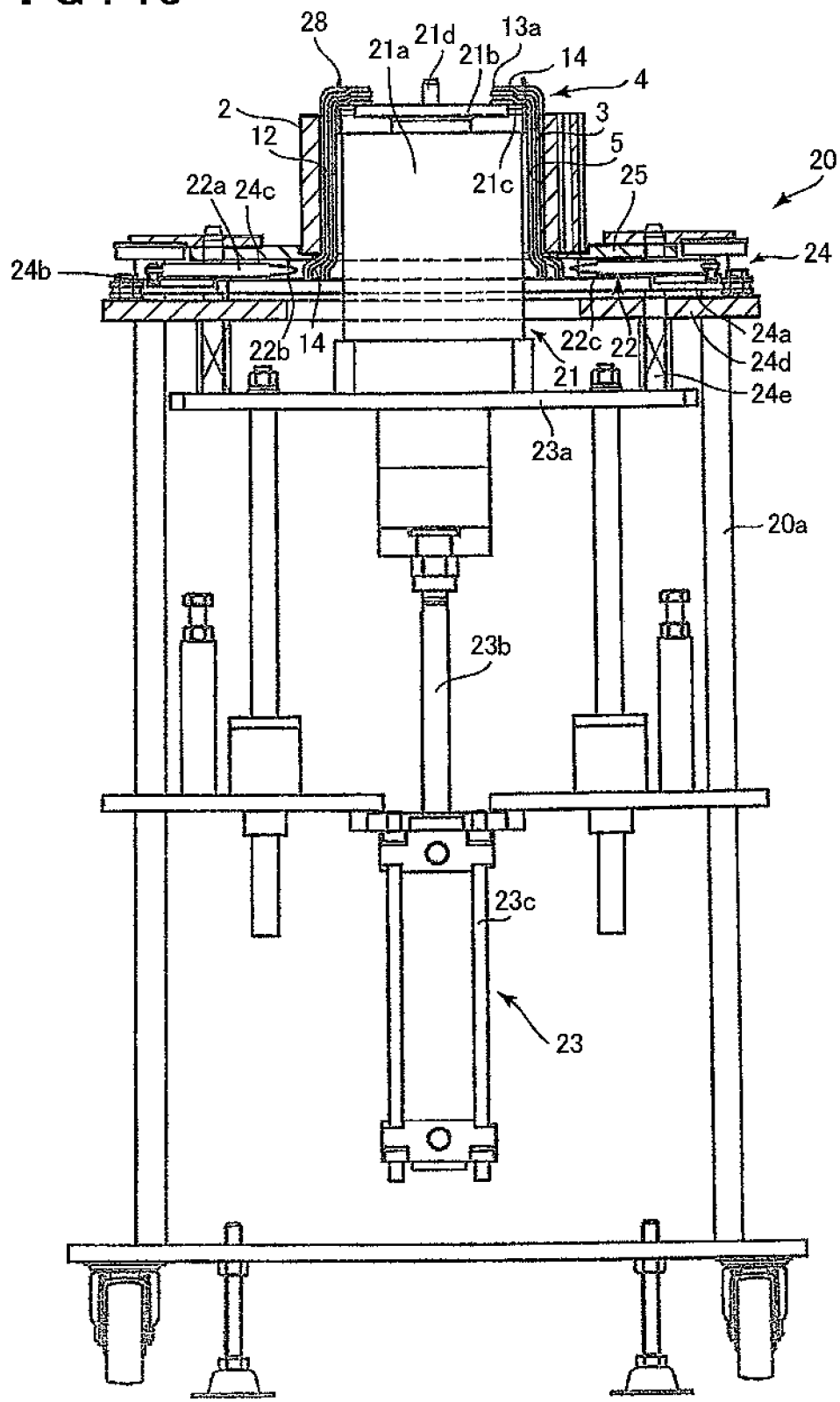
FIG. 18 shows a ninth step of the same stator manufacturing method, which is similar to FIG. 10.
Figure 19:
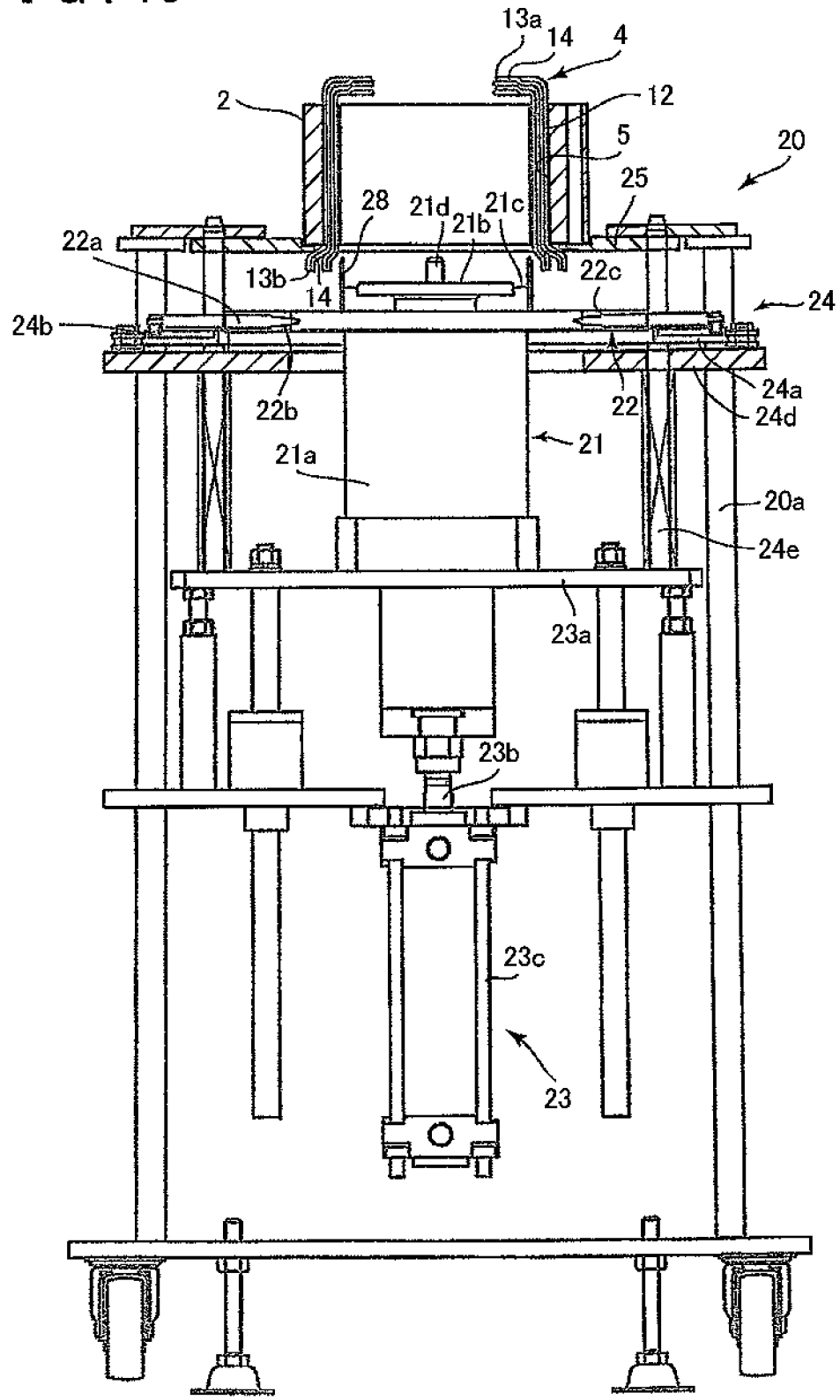
FIG. 19 shows a tenth step of the same stator manufacturing method, which is similar to FIG. 10.
Figure 20:
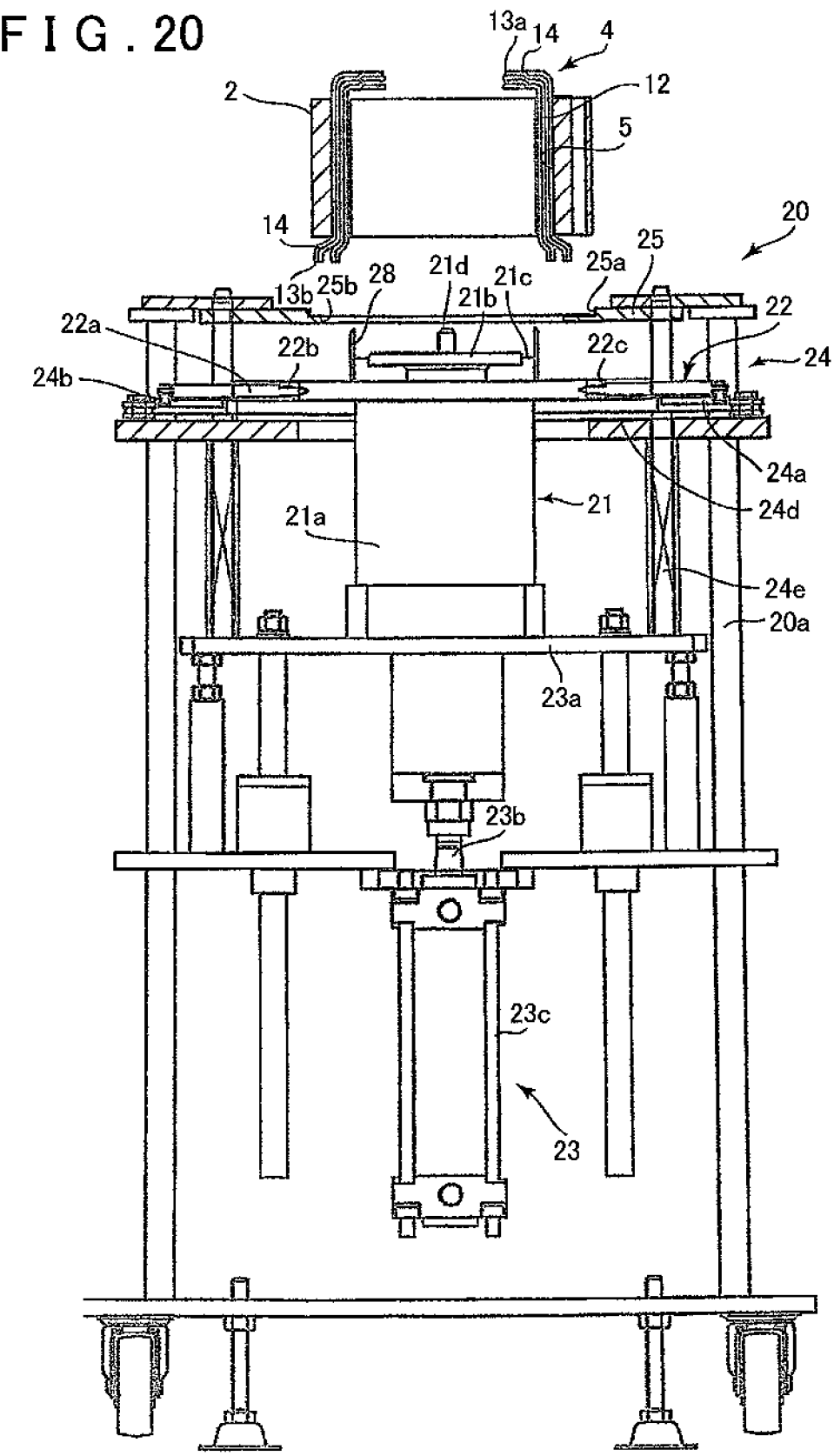
FIG. 20 shows an eleventh step of the same stator manufacturing method, which is similar to FIG. 10.

Next, the opening jigs 29 and the placement jig 30 are removed as shown in FIG. 18, and the ascending/descending mechanism 23 is driven to descend the insertion jig 21 as shown in FIG. 19. As a result, the insertion jig 21 is taken out of the stator core 2, and only the coil 4 is left in the stator core 2 to form the stator 1. Then, as shown in FIG. 20, the stator 1 is removed from the fixation table 25.

According to the embodiment, the circumferential positions of the straight portions 12 can be restricted along the axial direction by the restriction jig 22, and in this state, the coil 4 can be inserted into the stator core 2 from the first-end side in the axial direction. That is, the restriction pieces 22a are moved in the radial direction to insert the contact portions 22b between the adjacent ones of the straight portions 12. Therefore, along with the insertion, the straight portions 12 disposed side by side in the radial direction and in the same phase in the circumferential direction can be positioned appropriately in the circumferential direction on the first-end side in the axial direction. In this case, the circumferential positions of the straight portions 12 are restricted on the first-end side by the protruding pins 28 when disposing the coil 4 in the insertion jig 21. Therefore, the restriction pieces 22a can be smoothly disposed between the adjacent ones of the straight portions 12.

Then, by relatively moving the restriction jig 22 and the insertion jig 21 in the axial direction in this state, the contact portions 22b are moved while contacting the side surfaces of the straight portions 12. Therefore, the straight portions 12 are positioned in the circumferential direction along the axial direction. The straight portions 12 are gradually inserted into the slots 5 from the first-end side in the axial direction while being positioned in the circumferential direction from the first-end side in the axial direction as described above. Therefore, the work of disposing the coil 4 in the stator core 2 by distributed winding can be performed easily, and the straight portions 12 can be disposed in the slots 5 accurately. In particular, even if the straight portions 12 are inclined with respect to the slots 5, such inclination is corrected by the restriction jig 22. Therefore, the resistance of inserting the straight portions 12 into the slots 5 can be reduced to allow the insertion work to be performed smoothly and accurately. Such a reduction in insertion resistance can prevent damage that may occur to the coil 4 and the insulating sheet 31 disposed in the slots 5 during the insertion.

In the embodiment, as shown in FIG. 14, the restriction jig 22 is brought closer to the stator core 2. Therefore, the restriction jig 22 can restrict the straight portions 12 at a position closer to the stator core 2, which allows the work of inserting the coil 4 into the stator core 2 to be performed more accurately. The stepped surfaces 22c of the restriction pieces 22a are moved relatively while contacting the radially outer surfaces of the straight portions 12 on the radially outermost side. Therefore, the restriction jig 22 can also restrict the radial positions of the straight portions 12, which allows the work of inserting the coil 4 into the stator core 2 to be performed more easily and accurately.

In the embodiment, the work of inserting the coil 4 into the stator core 2 is performed with the distal-end portions of the opening portions 29b of the opening jig 29 disposed in the insulating sheet 31. Therefore, the end portion of the insulating sheet 31 can be maintained in an open state, which makes it unlikely that the distal end of the coil 4 interferes with the insulating sheet 31 during the insertion work. This prevents the insulating sheet 31 from being pushed by the coil 4 and coming off from the slots 5 during the insertion, and prevents the end portion of the insulating sheet 31 from being turned up and caught. The opening jigs 29 are inserted from openings of the slots 5 on the end surface opposite to the side from which the coil 4 is inserted to place the opening jigs 29 on the coil 4. Therefore, the insulating sheet 31 can be reliably spread in the slots 5 by inserting the opening jigs 29. This makes it more unlikely that the distal end of the coil 4 interferes with the insulating sheet 31.

According to the manufacturing apparatus 20 of the embodiment, any or all of mounting of the coil 4 to the insertion jig 21, installation of the stator core 2, installation and removal of the opening jigs 29, and removal of the stator 1 can be performed automatically (mechanically) or manually. By performing all or at least a part of the processes automatically (mechanically), the stator 1 can be manufactured more efficiently to improve the productivity. While the insertion jig 21 and the coil 4 are moved in the axial direction (upward in FIG. 3) in the above description, the stator core 2 and the restriction jig 22 may be moved in the axial direction (for example, downward in FIG. 3) with the insertion jig 21 and the coil 4 stationary. In this case, for example, the fixation table 25 and the movement mechanism 24 are movable in the axial direction.

The manufacturing method and the manufacturing apparatus for a stator according to the present invention can be used to manufacture a stator for a motor, and is particularly suitable for a structure in which rectangular wires are disposed by distributed winding such as a stator for a motor for hybrid vehicles.

What is claimed is:

1. A method for manufacturing a stator including a stator core having slots formed along an axial direction at a plurality of locations in a circumferential direction, and a coil that is formed by a plurality of rectangular cross-sectioned rectangular wires having a plurality of straight portions disposed in the slots and arranged side by side in the circumferential direction and in a radial direction, the coil being disposed in the stator core by distributed winding, the stator manufacturing method comprising:

combining the rectangular wires to form the coil;

disposing a restriction jig having a large number of restriction pieces, the number of which is the same as the number of the slots, on a first-end side of the coil in the axial direction such that the restriction pieces cause spaces between adjacent ones of the straight portions of the coil to have a width matching intervals between the slots, also disposing the restriction jig such that the restriction pieces are disposed outside the stator core in the axial direction; and inserting the coil into the stator core from the first-end side in the axial direction, remaining a state where the restriction pieces are disposed outside the stator core in the axial direction, to dispose the straight portions in the slots while restricting circumferential positions of the straight portions along the axial direction through contact with the restriction pieces, the coil being inserted by moving the restriction jig and the coil in the axial direction and by relatively moving the restriction jig from the first-end side to a second-end side of the coil in the axial direction.

2. The stator manufacturing method according to claim 1, wherein
after the restriction pieces are disposed around an entire circumference, the restriction pieces are moved in the radial direction to insert contact portions, which are respectively provided at distal-end portions of the restriction pieces, between the adjacent ones of the straight portions to position the straight portions in the circumferential direction on the first-end side in the axial direction.

3. The stator manufacturing method according to claim 1, wherein
the restriction jig is moved together with the coil closer to the stator core, and then the restriction jig and the stator core are moved relative to the coil in the axial direction.

4. The stator manufacturing method according to claim 1, wherein
the coil is inserted into the stator core from the first-end side in the axial direction while restricting radial positions of the straight portions along the axial direction by relatively moving the restriction jig and the coil in the axial direction while causing stepped surfaces, which are respectively provided on the restriction pieces, to contact radially outer surfaces of the straight portions located on a radially outermost side.

5. The stator manufacturing method according to claim 1, the stator further including an insulating sheet disposed between the slots and the straight portions, the method further comprising:
disposing the stator core on a side of a first-end surface of the coil in the axial direction;
thereafter placing an opening jig, which is configured to spread the insulating sheet disposed in advance in the slots such that the straight portions are disposed therein, on the first-end surface of the coil in the axial direction with a part of the opening jig disposed in the insulating sheet; and
then inserting the coil together with the opening jig into the stator core.

6. The stator manufacturing method according to claim 5, wherein
the opening jig is placed on the first-end surface of the coil in the axial direction by inserting the opening jig from an opening of the slots on an end surface opposite to a side from which the coil is inserted so as to spread the insulating sheet disposed in advance in the slots.

* * * * *